United States Patent [19]

Shibayama et al.

[11] Patent Number: 5,563,716
[45] Date of Patent: Oct. 8, 1996

[54] VIDEO SIGNAL REPRODUCING METHOD AND APPARATUS

[75] Inventors: Kenji Shibayama, Tokyo-To; Koji Suzuki, Yokohama, both of Japan

[73] Assignee: Victor Company of Japan, Ltd., Yokohama, Japan

[21] Appl. No.: 377,242

[22] Filed: Jan. 24, 1995

[30] Foreign Application Priority Data

Jan. 24, 1994 [JP] Japan .................................... 6-023409

[51] Int. Cl.$^6$ .............................. H04N 5/91; H04N 5/78; G11B 5/02
[52] U.S. Cl. ................................. 386/68; 386/23; 386/96
[58] Field of Search ................................... 358/335, 310, 358/312, 341, 343; 360/10.1, 19.1, 33.1; H04N 5/76, 5/78, 5/92, 9/79

[56] References Cited

U.S. PATENT DOCUMENTS

| | | | |
|---|---|---|---|
| 4,539,603 | 9/1985 | Takeuchi et al. | 360/10.1 |
| 4,633,332 | 12/1986 | Higurashi et al. | 358/343 |
| 4,660,104 | 4/1987 | Higurashi | 358/343 |
| 4,796,104 | 1/1989 | Ito et al. | 360/10.1 |
| 5,136,391 | 8/1992 | Minami . | |

FOREIGN PATENT DOCUMENTS

0540348A2   5/1993   European Pat. Off. .

64-5176   1/1989   Japan .

OTHER PUBLICATIONS

Seishi Sasaki, et al.; IEEE Transactions on Broadcasting, Dec. 1989; No. 4.
Sadayuki Inoue, et al.; IEEE Transactions on Consumer Electronics; Aug. 1991, No. 3.
Mr. J. Forrest, et al.; Symposium Record Broadcast Sessions, Jun. 10, 1993.

Primary Examiner—Thai Q. Tran
Attorney, Agent, or Firm—Jacobson, Price, Holman & Stern, PLLC

[57] ABSTRACT

A first reproduction signal is reproduced by use of a first pair of magnetic heads having first and second azimuth angles and arranged around a rotary drum at two opposing angular positions 180 degrees away from each other, respectively. A second reproduction signal is reproduced by use of a second pair of magnetic heads having first and second azimuth angles and arranged around the rotary drum at two opposing angular positions 180 degrees away from each other, respectively. A video signal is reproduced based on the first and second reproduction signals. The magnetic tape travel speed is set to a value $(2n+1\pm m/M)$ times higher than that in recording, where n is an integer of 0 or more; m and M are a natural number, respectively; $T \geq 12/(P+Q)$ (T: an integer) when $m/M = 2k/T$; and $P > 0$, $Q > 0$.

18 Claims, 13 Drawing Sheets

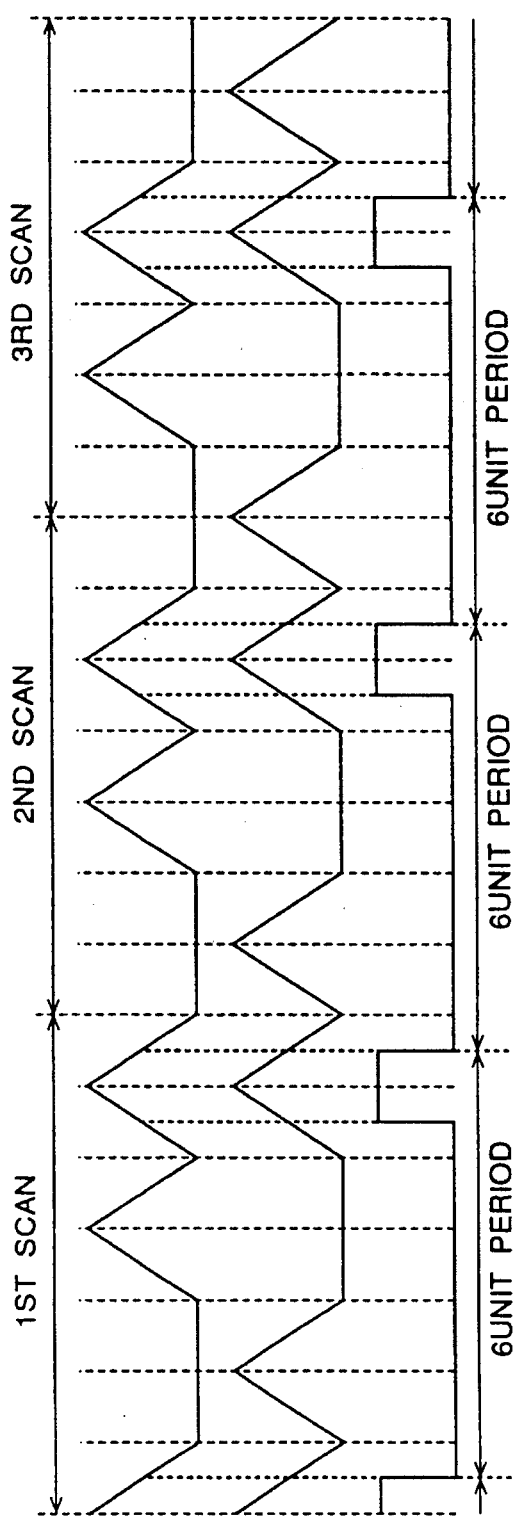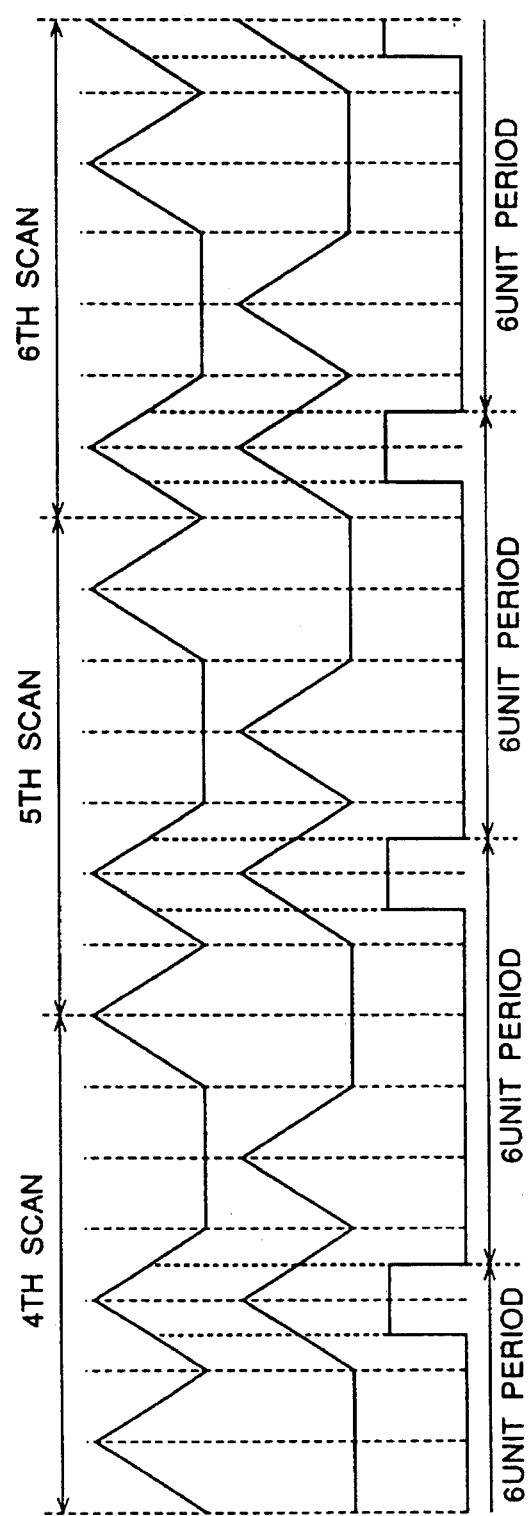
FIG.8A FIG.8B FIG.8C FIG.8D FIG.8E FIG.8F

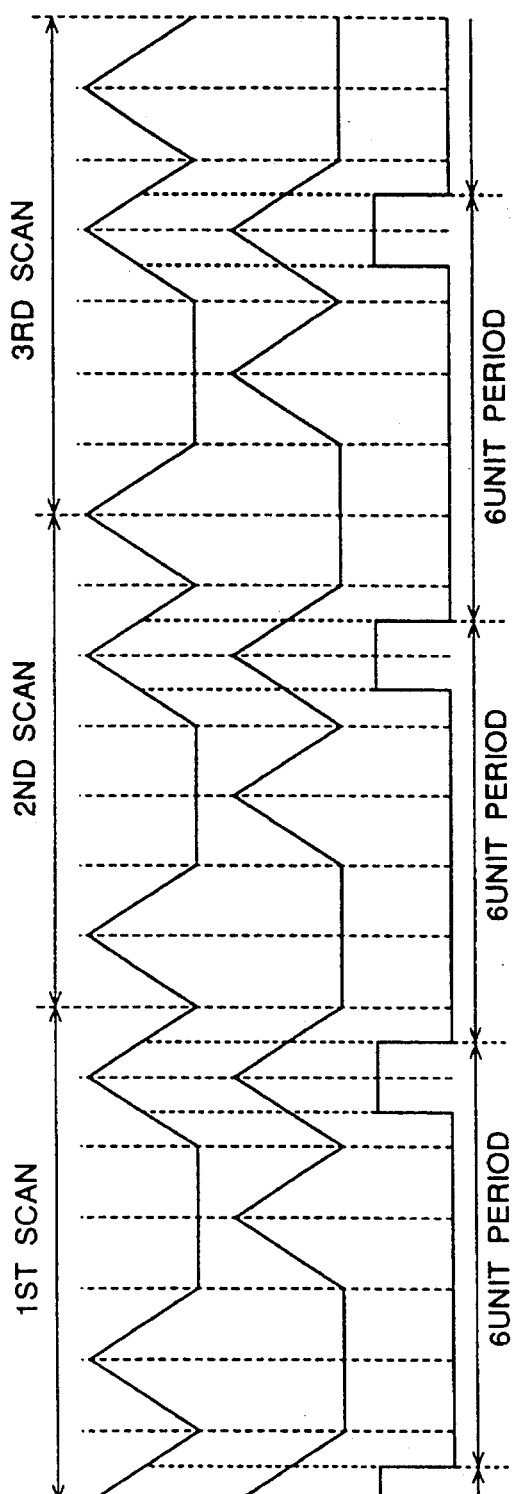
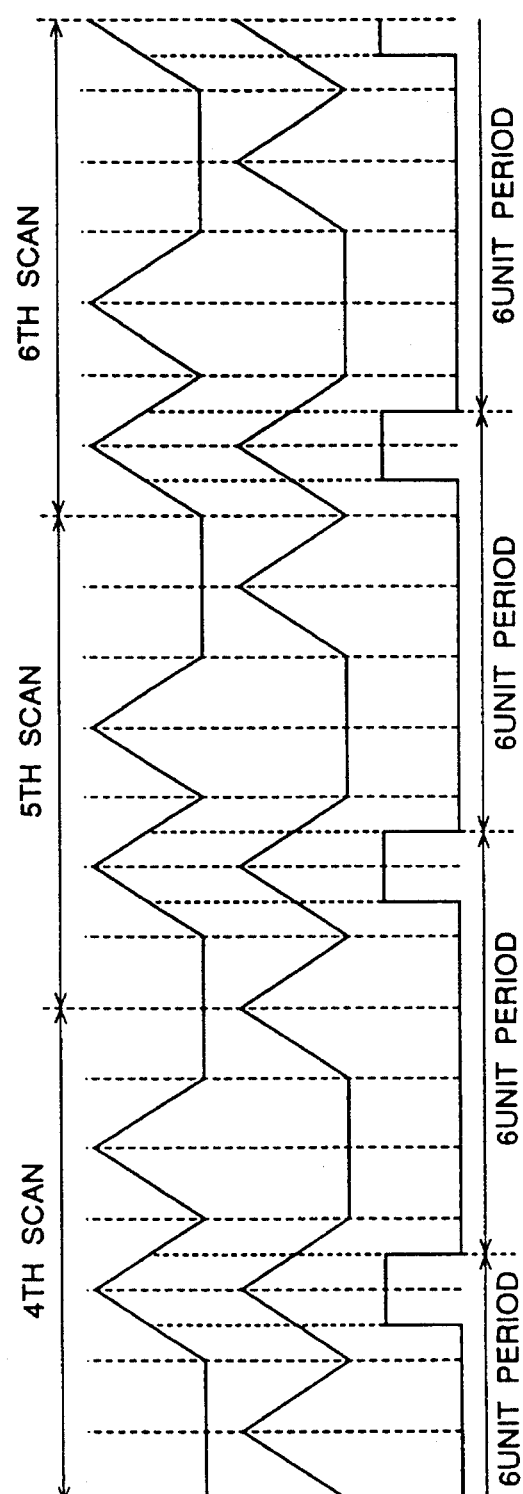
FIG.9A FIG.9B FIG.9C FIG.9D FIG.9E FIG.9F

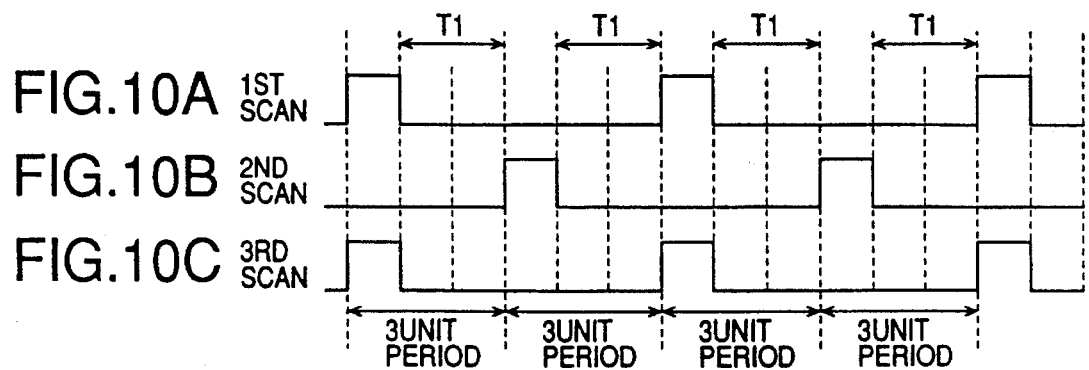
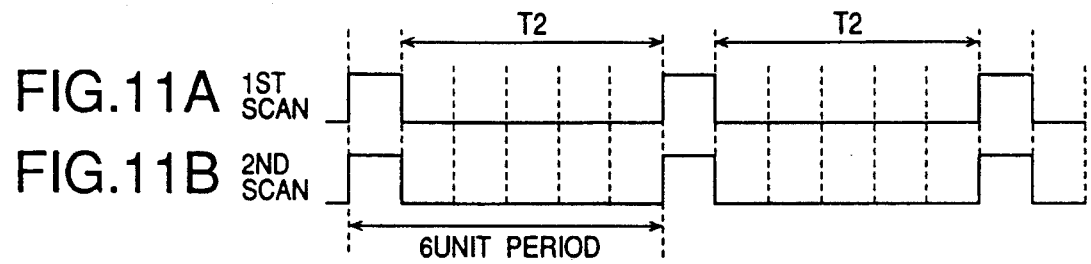
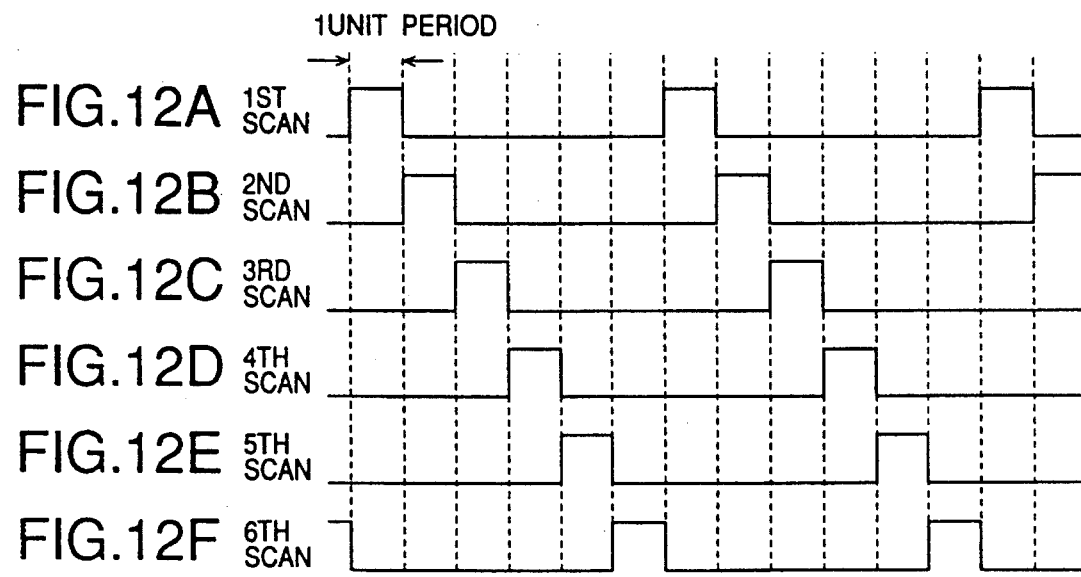

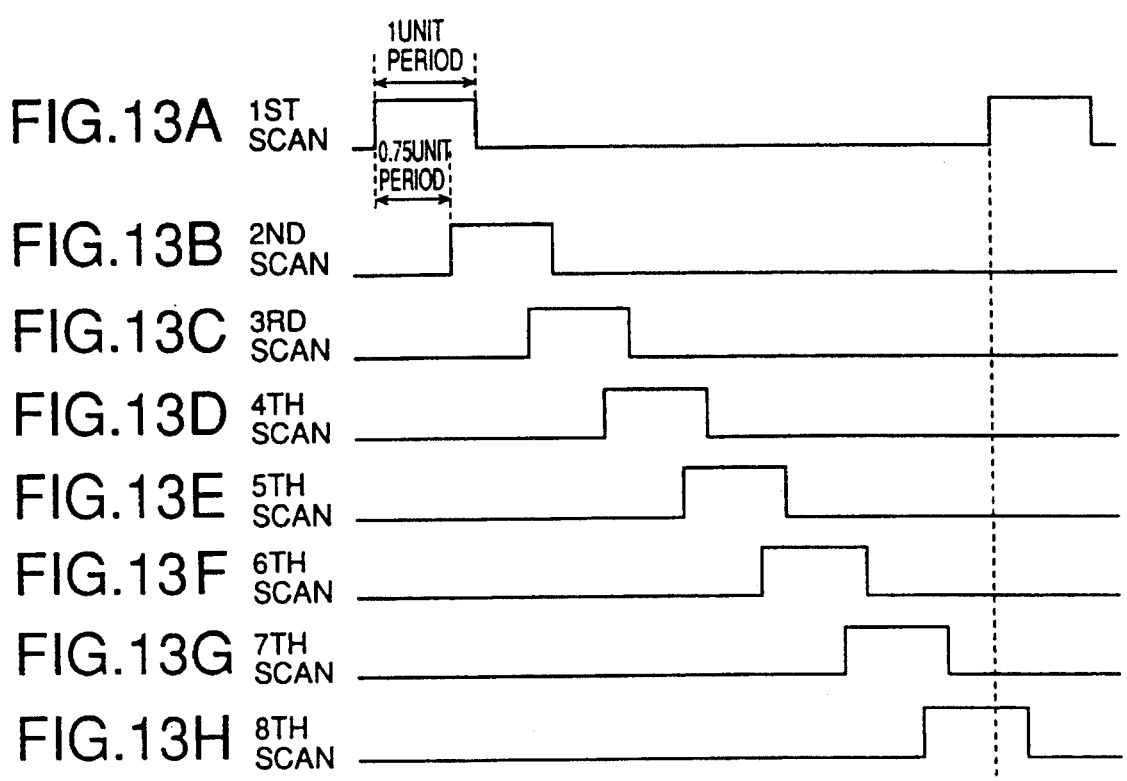
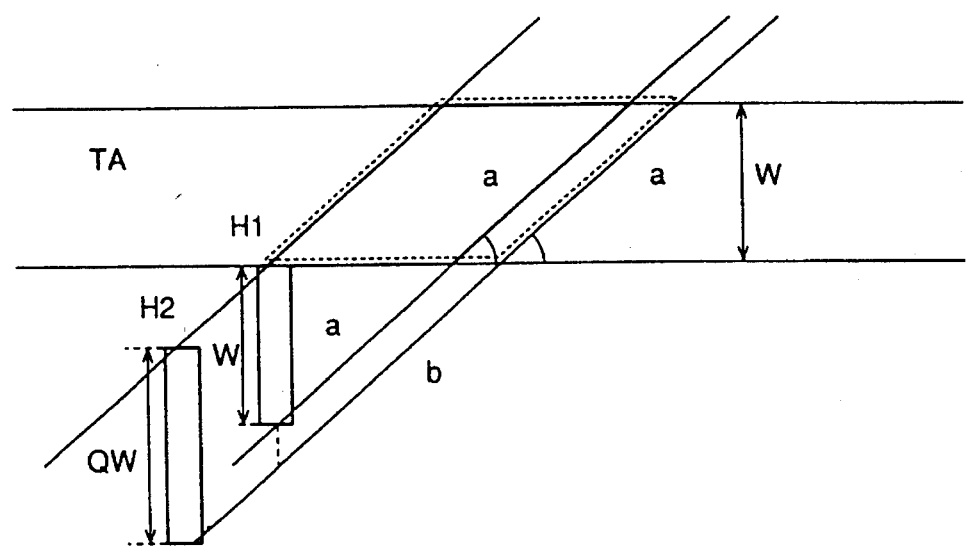
FIG. 14

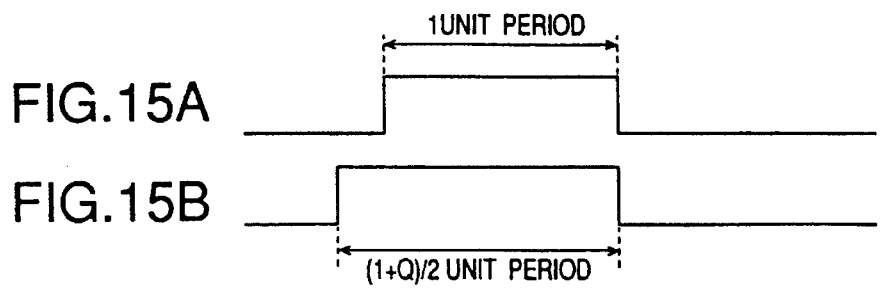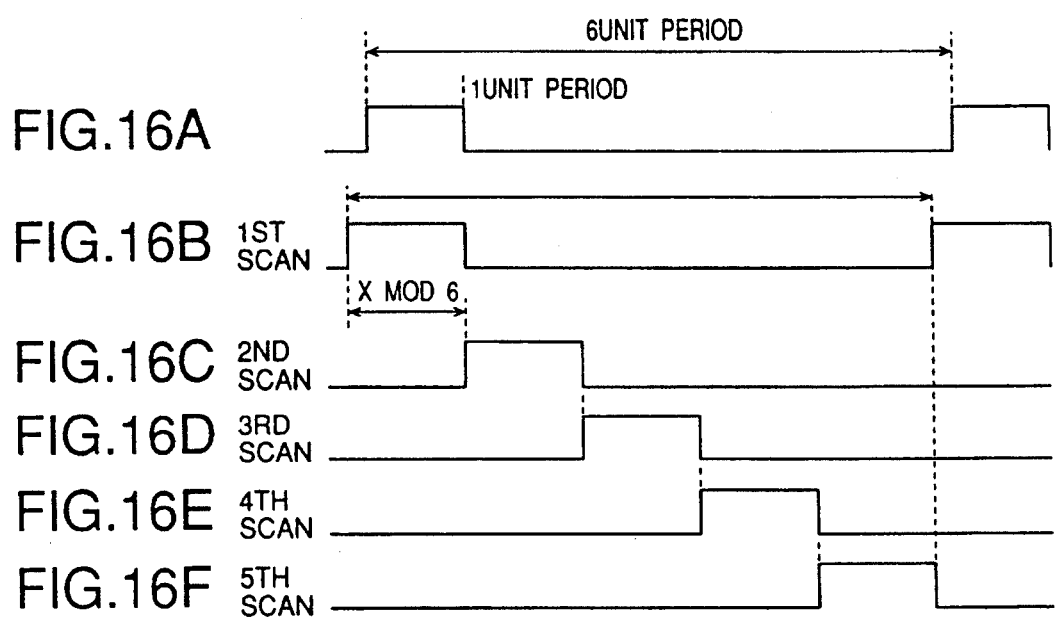

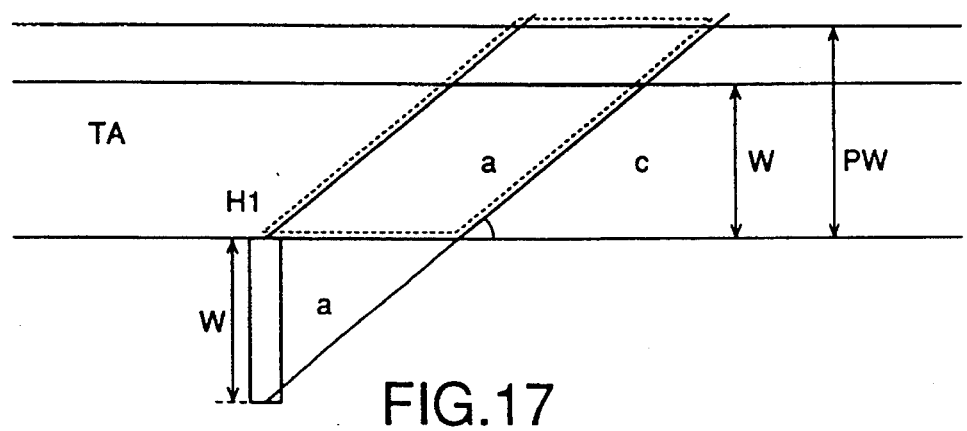
FIG.17
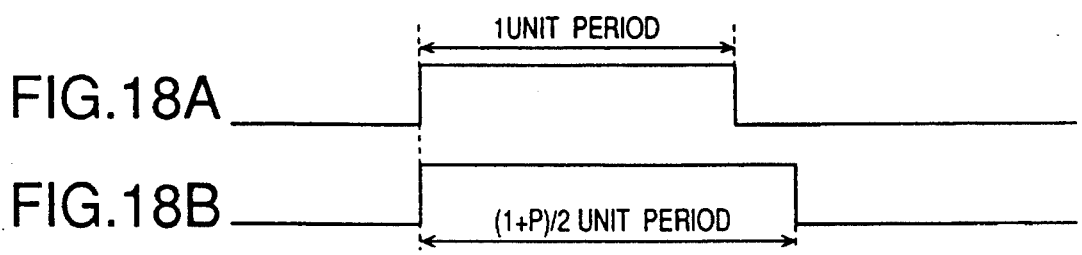
FIG.18A
FIG.18B
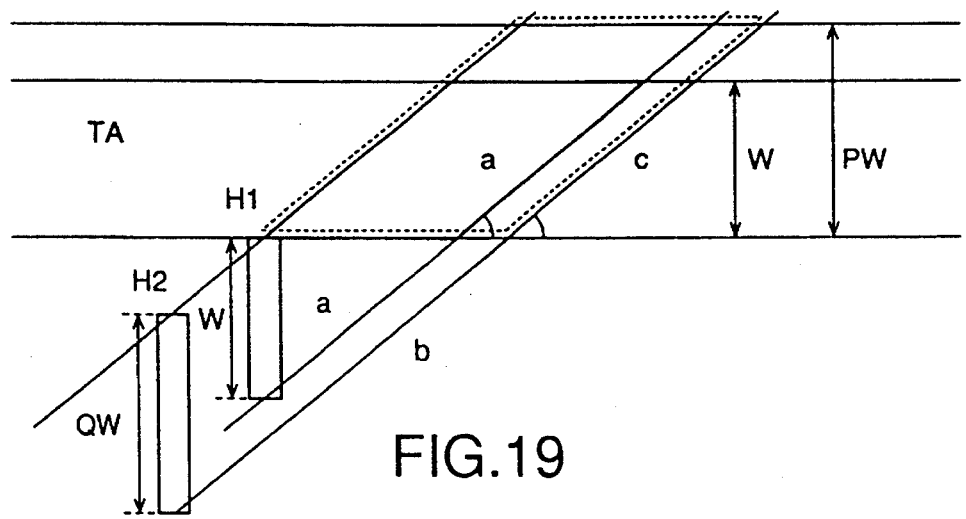
FIG.19
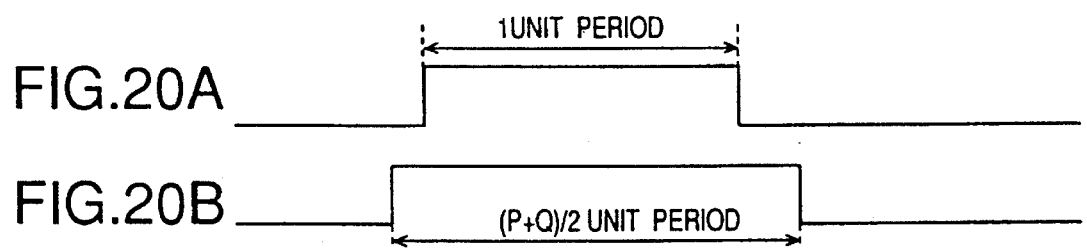
FIG.20A
FIG.20B

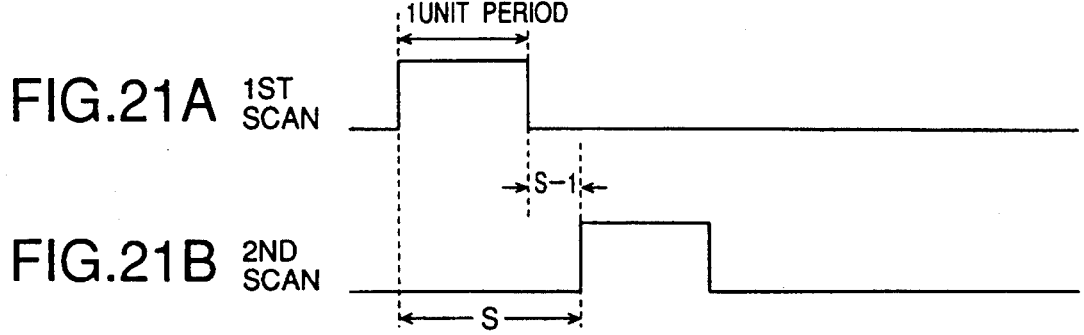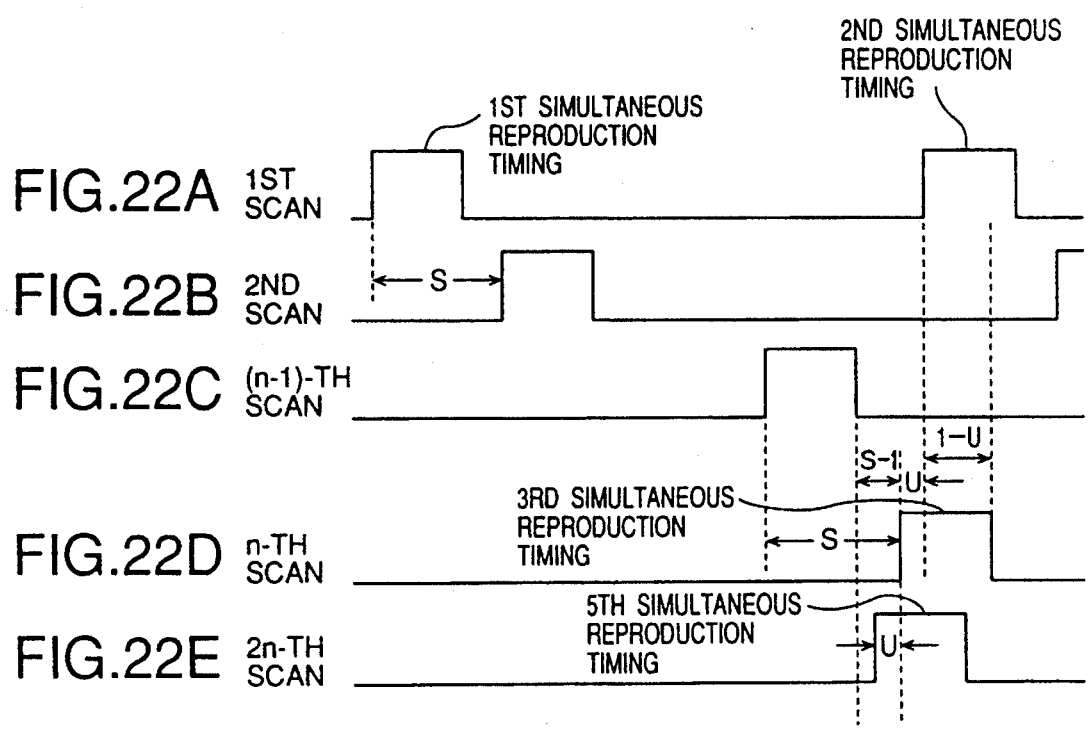

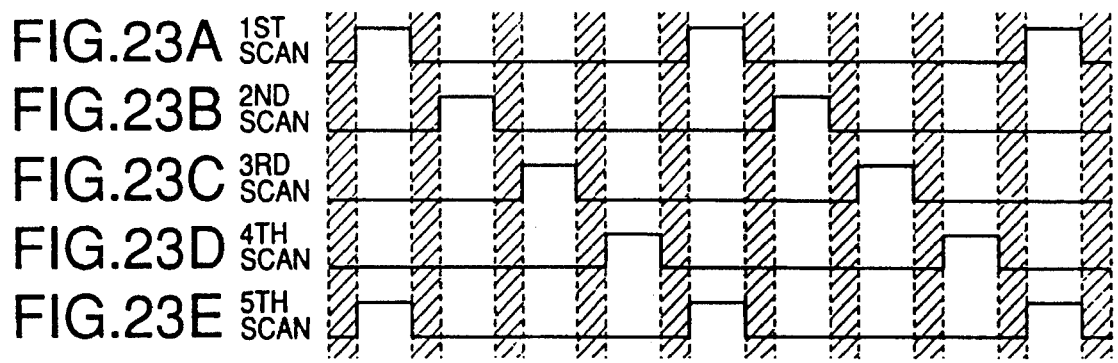
FIG.23A 1ST SCAN
FIG.23B 2ND SCAN
FIG.23C 3RD SCAN
FIG.23D 4TH SCAN
FIG.23E 5TH SCAN
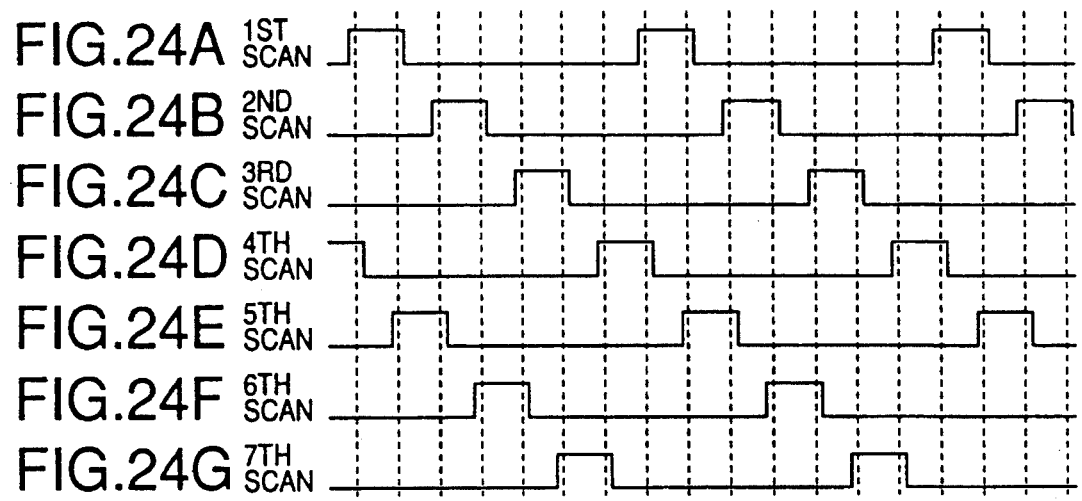
FIG.24A 1ST SCAN
FIG.24B 2ND SCAN
FIG.24C 3RD SCAN
FIG.24D 4TH SCAN
FIG.24E 5TH SCAN
FIG.24F 6TH SCAN
FIG.24G 7TH SCAN
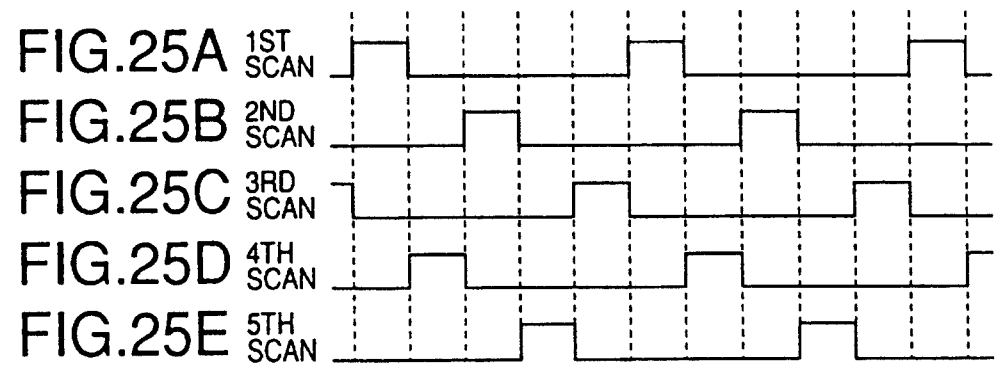
FIG.25A 1ST SCAN
FIG.25B 2ND SCAN
FIG.25C 3RD SCAN
FIG.25D 4TH SCAN
FIG.25E 5TH SCAN

VIDEO SIGNAL REPRODUCING METHOD AND APPARATUS

BACKGROUND OF THE INVENTION

1. Field of the Invention

The present invention relates to a video signal reproducing method and apparatus.

2. Description of the Related Art

Conventionally, a multi-channel segment recording and reproducing method has been known such that video signals for one picture are divided into a plurality of segments and further recorded or reproduced simultaneously through a plurality of channels to obtain recorded or reproduced video signals of wide band.

In the tape pattern of this multi-channel multi-segment recording and reproducing method, since one picture is recorded being divided into a plurality of tracks, when the recorded video signals are reproduced at any given variable speed, there exists such a problem in that video signals for predetermined periods in one picture cannot be reproduced and thereby noise bars are inevitably generated.

To overcome this problem, the same Inventors have already proposed such a video signal recording and reproducing apparatus that video signals (e.g., high vision video signals as one example of high-definition television video signals) divided into two channels and audio signals divided into one channel are recorded and reproduced simultaneously, in Japanese Patent Application No. 5-73067 (not yet published in Japan).

The above-mentioned apparatus will be explained in more detail hereinbelow with reference to FIGS. 1 to 5. In FIG. 1, a pair of audio heads A1 and A2, a pair of video heads WP1 and WP2, and another pair of video heads WQ1 and WQ2 are arranged, respectively around a rotary drum at such angular positions as to be opposed to each other (being spaced 180 degrees apart from each other), that is, so as to provide different azimuth angles. Here, the azimuth angles of the two video heads WP1 and WQ1 are the same, and the azimuth angles of the video heads WP2 and WQ2 are the same. On the other hand, the azimuth angles of the audio heads A1 and A2 are different from those of the video heads WP1, WQ1 and WP2, WQ2, respectively. These magnetic heads are mounted at different mounting heights and at different mounting angles, respectively, as shown in FIG. 2. The widths of these heads are roughly 19 µm, respectively for instance, which is equal to the track width. Further, these heads are mounted in such a way that the lower end edges of the video heads WP1 and WP2 and the upper end edges of the video heads WQ1 and WQ2 are located at the same height. In the following description, the assumption is made that the respective widths of the main tracks, the subsidiary tracks and the audio tracks are all equal to each other, and the widths of these tracks are referred to as a reference track width.

Further, the video heads WP1 and WP2 record or reproduce a first TCI (Time Compressed Integration) signal (described later) related to the first segment; on the other hand, the video heads WQ1 and WQ2 record or reproduce a second TCI signal (described later) related to the second segment.

By the magnetic heads as described above, a tape pattern of 3 tracks per field can be obtained as shown in FIG. 3, in which parentheses represent that each track is recorded by a head enclosed by each of the parentheses.

Here, if the tracks related to the video heads WP1 and WP2 are the main tracks and the tracks related to the video heads WQ1 and WQ2 are the subsidiary tracks, the first TCI signals as shown in FIG. 4A are recorded on the main tracks; on the other hand, the second TCI signals as shown in FIG. 4B are recorded on the subsidiary tracks, respectively. Further, in FIG. 4A, PR of the first TCI signal is a signal obtained by compressing the chrominance signal on the time axis along an odd line, and Y1 of the first TCI signal is a video signal obtained by compressing the luminance signal on the time axis along an odd line. Further, in FIG. 4B, PB of the second TCI signal is a video signal obtained by compressing the chrominance signal on the time axis along an even line, and Y2 of the second TCI signal is a video signal obtained by compressing the luminance signal on the time axis along an even line.

Further, the tape pattern on which line numbers are described is shown in FIG. 5, in which parentheses represent that each track is recorded by a head enclosed by each of the parentheses, respectively. Further, SW represents that a switching signal for securing a margin required for switching of the magnetic head is interposed; V represents that a vertical synchronizing signal for obtaining vertical synchronism is interposed; DA represents that a data signal for representing program contents, time codes, etc. is interposed; and CAL represents that a correction signal for correcting two-track (maine track and subsidiary track) transmission characteristics is interposed, respectively.

When the video signals recorded on a magnetic tape TT as described above are reproduced at variable tape travel speeds, since chrominance signals (color differential signals) PR and PB are recorded being divided into the main tracks and the subsidiary tracks, if these signals are separated several fields away from each other (without being adjacent to each other), there exists a problem in that image color is not natural.

In addition, in variable tape travel speed reproduction, since the video signals cannot be processed (e.g., the processing of chrominance signals PB and PR) for each segment without discriminating to which segment the current reproduced signals belong, signals for discriminating the current segment must be interposed several times in one track, thus causing another problem in that the efficiency of utilizing a magnetic medium is inevitably lowered.

Further, in the case of motion picture, there exists another need of making the reproduced motion picture more smoothly.

SUMMARY OF THE INVENTION

With these problems in mind, therefore, it is the object of the present invention to provide a video signal reproducing method and apparatus, which can reproduce video signals at variable tape travel speeds, without generating any noise bars and causing any unnaturalness of color image or picture, while improving the utilization efficiency of a magnetic medium.

To achieve the above-mentioned object, the present invention provides a method of reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises the steps of: reproducing a first reproduction signal recorded on a predetermined position of the magnetic tape by use of a first pair of magnetic heads having the first and second azimuth angles and arranged around a rotary drum at two opposing angular positions 180 degrees away each other, respectively; reproducing a second reproduction signal recorded on a position adjacent to the predetermined position of the magnetic tape by use of a second pair of magnetic heads having the first and second azimuth angles and arranged around the rotary drum at two opposing angular positions 180 degrees away each other, respectively; reproducing output video signals on the basis of the first and second reproduction signals; and the magnetic tape travel speed in variable speed reproduction being set to a value $(2n+1\pm m/M)$ times higher than that in recording, where n is an integer of 0 or more; m and M are a natural number, respectively; and $0<m/M\leq 1/3$.

In the above video signal reproducing method, the magnetic tape travel speed in variable speed reproduction can be set to a value $(2n+1\pm m/M)$ times higher than that in recording, where n is an integer of 0 or more; M is an integer of two or more, respectively; m and k are an integer of 1 or more, respectively; M>m (a prime number, respectively); and $T\geq 6$ (T: an integer) when $m/M=2k/T$.

Further, the present invention provides a method of reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises the steps of: reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively; reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively; reproducing output video signals on the basis of the first and second reproduction signals; and the magnetic tape travel speed in variable speed reproduction being set to a value $(2n+1\pm m/M)$ times higher than that in recording, where n is an integer of 0 or more; m and M are a natural number, respectively; and $0<m/M\leq(1+Q)/6$.

In the above-mentioned video signal reproducing method, the magnetic tape travel speed in variable speed reproduction can be set to a value $(2n+1\pm m/M)$ times higher than that in recording, where n is an integer of 0 or more; M is an integer of two or more, respectively; m and k are an integer of 1 or more, respectively; M>m (a prime number, respectively); and $T\geq 12/(1+Q)$ (T: an integer) when $m/M=2k/T$.

Further, the present invention provides a method of reproducing video signals recorded on a magnetic tape at a variable magnetic tape travel speed different from that in recording, a first video signal related to a first field being recorded on a first track having a track width P (P>0) times wider than a reference track width of the magnetic tape at a first azimuth angle, a second video signal related to the first field being recorded on a second track having a track width P times wider than the reference track width thereof at a second azimuth angle, an audio signal related to the first field being recorded on a third track thereof at a third azimuth angle, further the first video signal related to a second field being recorded on a fourth track having a track width P times wider than the reference track width of the magnetic tape at the second azimuth angle, the second video signal related to the second field being recorded on a fifth track having a track width P times wider than the reference track width thereof at the first azimuth angle, an audio signal related to the second field being recorded on a sixth track thereof at a fourth azimuth angle, respectively and repeatedly, which comprises the steps of: reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively; reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively; reproducing output video signals on the basis of the first and second reproduction signals; and setting the magnetic tape travel speed in variable speed reproduction to a value $(2n+1\pm m/M)$ times higher than that in recording, where n is an integer of 0 or more; m and M are a natural number, respectively; and $0<m/M\geq(P+Q)/6$.

In the above-mentioned video signal reproducing method, the magnetic tape travel speed in variable speed reproduction is set to a value $(2n+1\pm m/M)$ times higher than that in recording, where n is an integer of 0 or more; M is an integer of two or more, respectively; m and k are an integer of 1 or more, respectively; M>m (a prime number, respectively); and $T\geq 12/(P+Q)$ (T: an integer) when $m/M=2k/T$.

Further, the present invention provides an apparatus for reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises: first reproducing means for reproducing a first reproduction signal recorded on a predetermined position of the magnetic tape by use of a first pair of magnetic heads having the first and second azimuth angles and arranged around a rotary drum at two opposing angular positions 180 degrees away each other, respectively; second reproducing means for reproducing a second reproduction signal recorded on a position adjacent to the predetermined position of the magnetic tape by use of a second pair of magnetic heads having the first and second azimuth angles and arranged around the rotary drum at two opposing angular positions 180 degrees away each other, respectively; control signal generating means for generating a control signal for specifying a period during which the first and second reproduction signals are reproduced at a level higher than a predetermined threshold level, respectively; memory means controlled in write operation on the basis of a predetermined phase signal indicative of a phase difference between the control signal and the rotary drum, for storing signals obtained by processing the first and second reproduction signals; output video signal generating means for generating output video signals on the basis of signals outputted from said memory means; and travel control means for controlling the magnetic tape travel speed in variable speed reproduction at a value $(2n+1\pm m/M)$ times higher than that in recording, where n is an integer of 0 or more; m and M are a natural number, respectively; and $0 < m/M \leq \frac{1}{3}$.

In the above-mentioned video signal reproducing apparatus, said control signal generating means comprises: detecting means for detecting levels of the first and second reproduction signals, respectively; comparing means for comparing the detected levels with a predetermined threshold value, to output first and second comparison signals according to comparison results, respectively; and logical means for generating the control signal on the basis of a logical product of the first and second comparison signals.

Further, said travel control means comprises: generating means responsive to a predetermined synchronous signal synchronized with a revolution period of the rotary drum (rotary head), for generating a motor drive signal; detecting means for detecting a revolution speed of a capstan motor driven by the motor drive signal and outputting a detection signal; and dividing means for dividing the detection signal at a division ratio corresponding to the magnetic tape travel speed $(2n+1\pm m/M)$ times higher than that in recording, said generating means comparing the divided detection signal with the synchronous signal with respect to phase, to generate the motor drive signal.

Further, said travel control means controls the magnetic tape travel speed in variable speed reproduction at a value $(2n+1\pm m/M)$ times higher than that in recording, where n is an integer of 0 or more; M is an integer of two or more, respectively; m and k are an integer of 1 or more, respectively; M>m (a prime number, respectively); and $T \geq 6$ (T: an integer) when $m/M = 2k/T$.

Further, the present invention provides an apparatus for reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises: first reproducing means for reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively; second reproducing means for reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively; control signal generating means for generating a control signal for specifying a period during which the first and second reproduction signals are reproduced at a level higher than a predetermined threshold level, respectively; memory means controlled in write operation on the basis of a predetermined phase signal indicative of a phase difference between the control signal and the rotary drum, for storing signals obtained by processing the first and second reproduction signals; output video signal generating means for generating output video signals on the basis of signals outputted from said memory means; and travel control means for controlling the magnetic tape travel speed in variable speed reproduction at a value $(2n+1\pm m/M)$ times higher than that in recording, where n is an integer of 0 or more; m and M are a natural number, respectively; and $0 < m/M \leq (1+Q)/6$.

In the above-mentioned video signal reproducing apparatus, said control signal generating means comprises: detecting means for detecting levels of the first and second reproduction signals, respectively; comparing means for comparing the detected levels with a predetermined threshold value, to output first and second comparison signals according to comparison results, respectively; and logical means for generating the control signal on the basis of a logical product of the first and second comparison signals.

Further, said travel control means comprises: generating means responsive to a predetermined synchronous signal synchronized with a revolution period of the rotary drum, for generating a motor drive signal; detecting means for detecting a revolution speed of a capstan motor driven by the motor drive signal and outputting a detection signal; and dividing means for dividing the detection signal at a division ratio corresponding to the magnetic tape travel speed $(2n+1\pm m/M)$ times higher than that in recording, said generating means comparing the divided detection signal with the synchronous signal with respect to phase, to generate the motor drive signal.

Further, said travel control means controls the magnetic tape travel speed in variable speed reproduction at a value $(2n+1\pm m/M)$ times higher than that in recording, where n is an integer of 0 or more; M is an integer of two or more, respectively; m and k are an integer of 1 or more, respectively; M>m (a prime number, respectively); and $T \geq 12/(1+Q)$ (T: an integer) when $m/M = 2k/T$.

Further, the present invention provides an apparatus for reproducing video signals recorded on a magnetic tape at a variable magnetic tape travel speed different from that in recording, a first video signal related to a first field being recorded on a first track having a track width P (P>0) times wider than a reference track width of the magnetic tape at a first azimuth angle, a second video signal related to the first field being recorded on a second track having a track width P times wider than the reference track width thereof at a second azimuth angle, an audio signal related to the first field being recorded on a third track thereof at a third azimuth angle, further the first video signal related to a second field being recorded on a fourth track having a track width P times wider than the reference track width of the magnetic tape at the second azimuth angle, the second video signal related to the second field being recorded on a fifth track having a track width P times wider than the reference track width thereof at the first azimuth angle, an audio signal related to the second field being recorded on a sixth track thereof at a fourth azimuth angle, respectively and repeatedly, which comprises: first reproducing means for reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively; second reproducing means for reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively; control signal generating means for generating a control signal for specifying a period during which the first and second reproduction signals are reproduced at a level higher than a predetermined threshold level, respectively; memory means controlled in write operation on the basis of a predetermined phase signal indicative of a phase difference between the control signal and the rotary drum, for storing signals obtained by processing the first and second reproduction signals; output video signal generating means for generating output video signals on the basis of signals outputted from said memory means; and travel control means for controlling the magnetic tape travel speed in variable speed reproduction at a value $(2n+1\pm m/M)$ times higher than that in recording, where n is an integer of 0 or more; m and M are a natural number, respectively; and $0<m/M\geq(P+Q)/6$.

In the above-mentioned video signal reproducing apparatus, said control signal generating means comprises: detecting means for detecting levels of the first and second reproduction signals, respectively; comparing means for comparing the detected levels with a predetermined threshold value, to output first and second comparison signals according to comparison results, respectively; and logical means for generating the control signal on the basis of a logical product of the first and second comparison signals.

Further, said travel control means comprises: generating means responsive to a predetermined synchronous signal synchronized with a revolution period of the rotary drum, for generating a motor drive signal; detecting means for detecting a revolution speed of a capstan motor driven by the motor drive signal and outputting a detection signal; and dividing means for dividing the detection signal at a division ratio corresponding to the magnetic tape travel speed $(2n+1\pm m/M)$ times higher than that in recording, said generating means comparing the divided detection signal with the synchronous signal with respect to phase, to generate the motor drive signal.

Further, said travel control means controls the magnetic tape travel speed in variable speed reproduction at a value $(2n+1\pm m/M)$ times higher than that in recording, where n is an integer of 0 or more; M is an integer of two or more, respectively; m and k are an integer of 1 or more, respectively; M>m (a prime number, respectively); and $T\geq 12/(P+Q)$ (T: an integer) when $m/M=2k/T$.

BRIEF DESCRIPTION OF THE DRAWINGS

FIGS. 8A to 8F are timing charts for assistance in explaining the forward-direction variable speed reproduction of the first embodiment of the video signal reproducing method according to the present invention;

FIGS. 9A to 9F are timing charts for assistance in explaining the reverse-direction variable speed reproduction of the first embodiment of the video signal reproducing method according to the present invention;

FIGS. 10A to 10C are timing charts for assistance in explaining the reproduction of the first embodiment at a tape travel speed even-number times higher than the recording speed;

FIGS. 11A and 11B are timing charts for assistance in explaining the reproduction of the first embodiment at a tape travel speed odd-number times higher than the recording speed;

FIGS. 12A to 12F are timing charts for assistance in explaining an example of the noiseless variable speed reproductions in the first embodiment;

FIGS. 13A to 13H are timing charts for assistance in explaining another example of the noiseless variable speed reproduction in the first embodiment;

FIG. 14 is a conceptual diagram for assistance in explaining a reproduction period obtained when video signals recorded on a magnetic tape having a reference track width are reproduced by a magnetic head having a head width Q-times wider than the reference track width in a second embodiment of the video signal reproducing method according to the present invention;

FIGS. 15A and 15B are conceptual diagrams for assistance in explaining simultaneous reproduction periods obtained when video signals recorded on a magnetic tape having a reference track width are reproduced by a magnetic head having a head width Q-times wider than the reference track width in the second embodiment;

FIGS. 16A to 16F are timing charts for assistance in explaining an example of variable speed reproduction of when one picture is composed of 5 scanning in the second embodiment of the video signal reproducing method according to the present invention;

FIG. 17 is a conceptual diagram for assistance in explaining a reproduction period obtained when video signals recorded on a magnetic tape having a track width P times wider than the reference track width are reproduced by a magnetic head having a head width equal to the reference track width in a third embodiment of the video signal reproducing method according to the present invention;

FIGS. 18A and 18B are conceptual diagrams for assistance in explaining simultaneous reproduction periods obtained when video signals recorded on a magnetic tape having a track width P times wider than the reference track width are reproduced by a magnetic head having a head width equal to the reference track width in the third embodiment;

FIG. 19 is a conceptual diagram for assistance in explaining a reproduction period obtained when video signals recorded on a magnetic tape having a track width P times wider than the reference track width are reproduced by a magnetic head having a head width Q times wider than the reference track width in a fourth embodiment of the video signal reproducing method according to the present invention;

FIGS. 20A and 20B are conceptual diagrams for assistance in explaining simultaneous reproduction periods obtained when video signals recorded on a magnetic tape having a track width P times wider than the reference track width are reproduced by a magnetic head having a head width Q times wider than the reference track width in the fourth embodiment;

FIGS. 21A and 21B are timing charts for assistance in explaining the generation of a noise bar in a fifth embodiment;

FIGS. 22A to 22E are timing charts for assistance in explaining the noiseless variable reproduction speed in the fifth embodiment;

FIGS. 23A to 23E are timing charts for assistance in explaining the variable reproduction speed at which noise bars are generated in the fifth embodiment;

FIGS. 24A to 24G are timing charts for assistance in explaining an example of the noiseless variable speed reproduction in the fifth embodiment;

FIGS. 25A to 25E are timing charts for assistance in explaining an example of the noiseless variable speed reproduction having noise bar in a sixth embodiment.

DETAILED DESCRIPTION OF THE EMBODIMENTS

Figure 1:
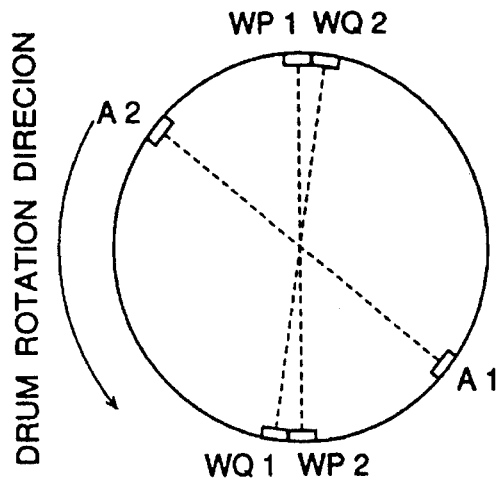
FIG. 1 is a plane view for assistance in explaining the magnetic head arrangement around a rotary drum in a conventional video signal reproducing apparatus related to the present invention.
Figure 2:
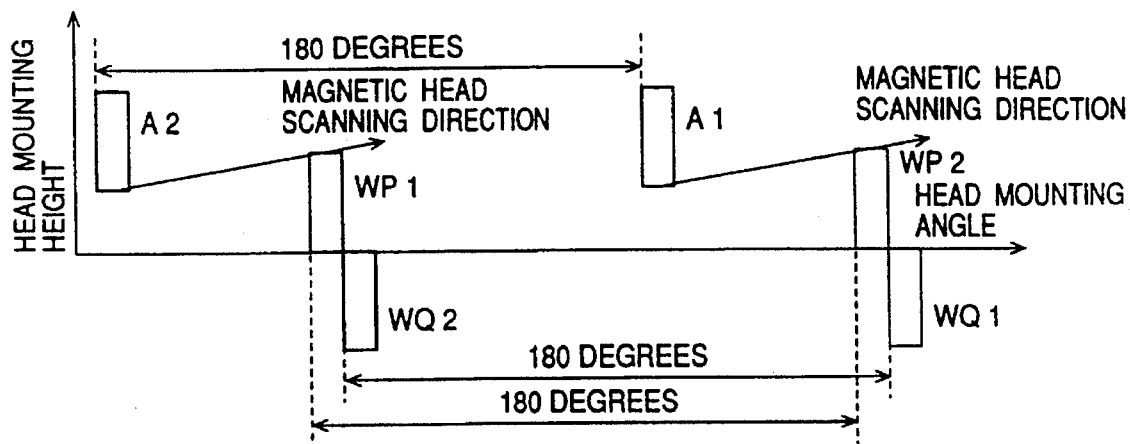
FIG. 2 is a conceptual diagram for assistance in explaining the magnetic head arrangement in the height direction.
Figure 3:
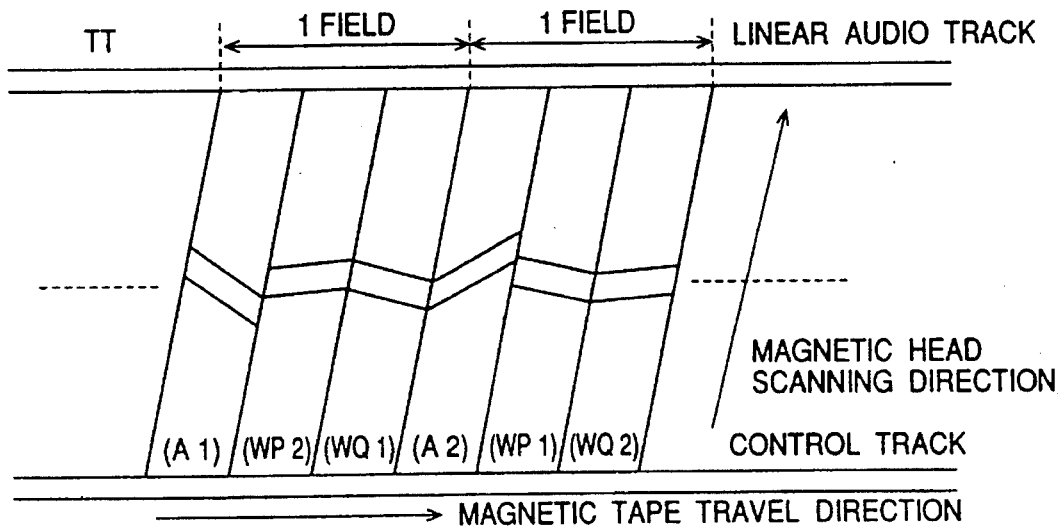
FIG. 3 is a diagram showing a tape pattern formed by the magnetic heads shown in FIG. 1.
Figure 4A:
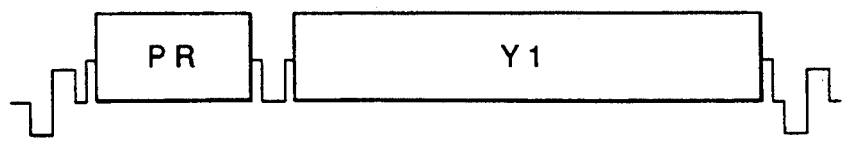
FIGS. 4A and 4B are waveform diagrams showing the first and second TCI signals recorded along the video signal tracks of a magnetic tape.
Figure 4B:
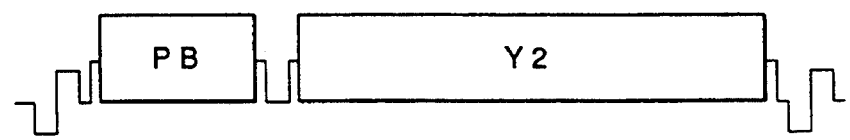

The video signal reproducing method and apparatus according to the present invention will be described hereinbelow with reference to the attached drawings.
(First embodiment)

The variable speed reproduction will be first explained with reference to FIG. 6, in which a magnetic tape is driven in the reproduction direction (referred to as a positive direction, hereinafter) the same as the recording direction. In the drawing, symbols shown on the left side of a magnetic tape TT designate reproducing magnetic heads related to the scanning across the surface of the magnetic tape, and symbols enclosed by parentheses on the right side of the magnetic tape TT designate magnetic heads used for recording. Further, the scanning direction of the magnetic heads for reproducing shown on the right side in FIG. 6 corresponds to the case where signals are reproduced at a magnetic tape travel speed (3+⅓) times higher than that in recording. In addition, the magnetic head scanning direction shown by an arrow A in FIG. 6 corresponds to the case where signals are reproduced at the ordinary tape travel speed equal to that in recording (the same speed), and that shown by an arrow B corresponds to the case where signals are reproduced at a tape travel speed twice higher than that in recording (twice speed).

Figure 7:
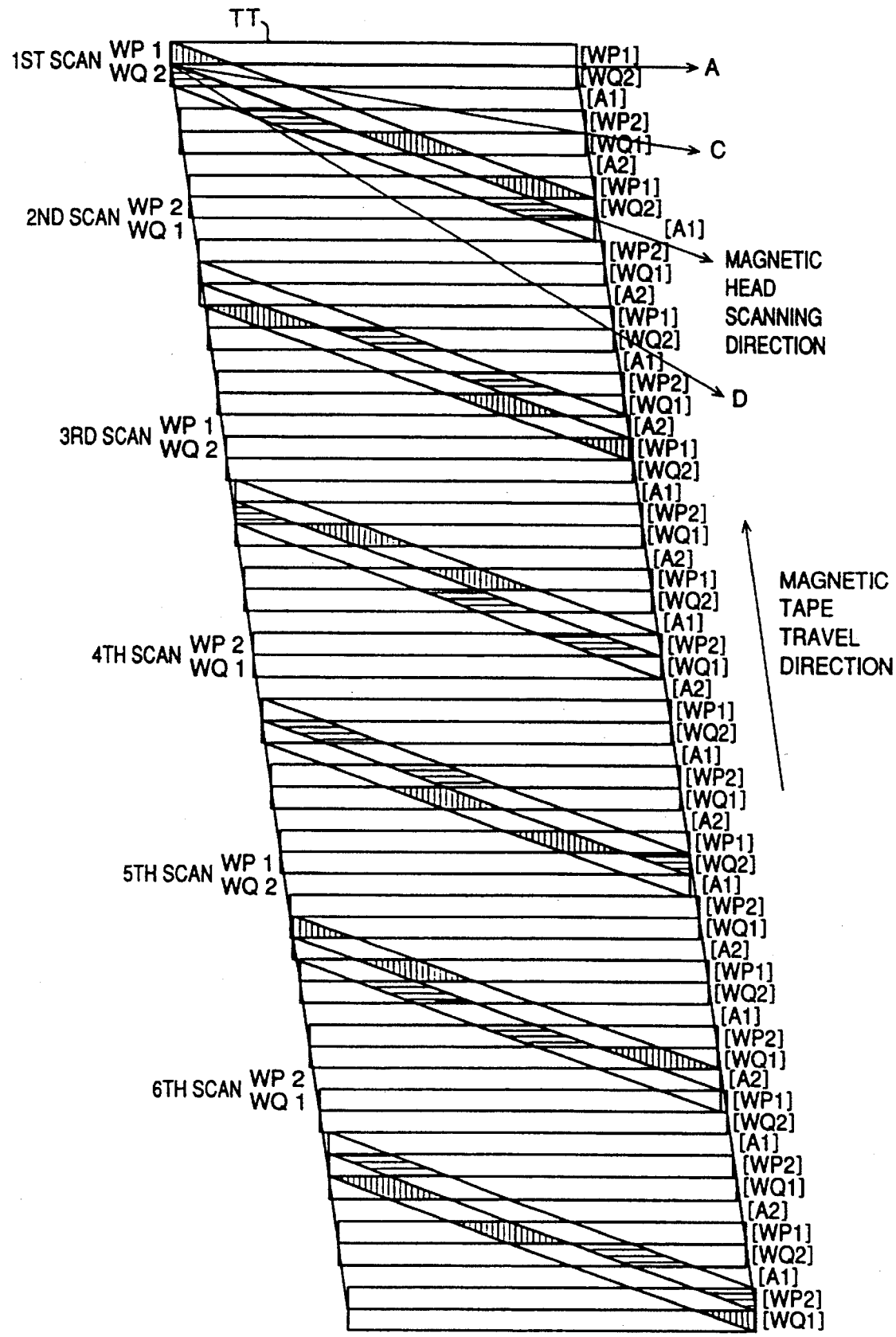
FIG. 7 is a tape pattern diagram for assistance in explaining the reverse-direction variable speed reproduction of the first embodiment of the video signal reproducing method according to the present invention.

On the other hand, FIG. 7 shows the variable speed reproduction, in which the magnetic tape is driven in the reproduction direction opposite to the recording direction (referred to as a negative direction, hereinafter) Further, the scanning direction of the magnetic heads shown on the right side in FIG. 7 corresponds to the case where signals are reproduced at a magnetic tape travel speed (1+⅓) times higher than in recording in the negative direction. In addition, the magnetic head scanning direction shown by an arrow C in FIG. 7 corresponds to the case the magnetic tape is at halt (still mode) and that shown by an arrow D corresponds to the tape travel speed three times higher than that in recording (three time speed) in the negative direction.

Figure 6:
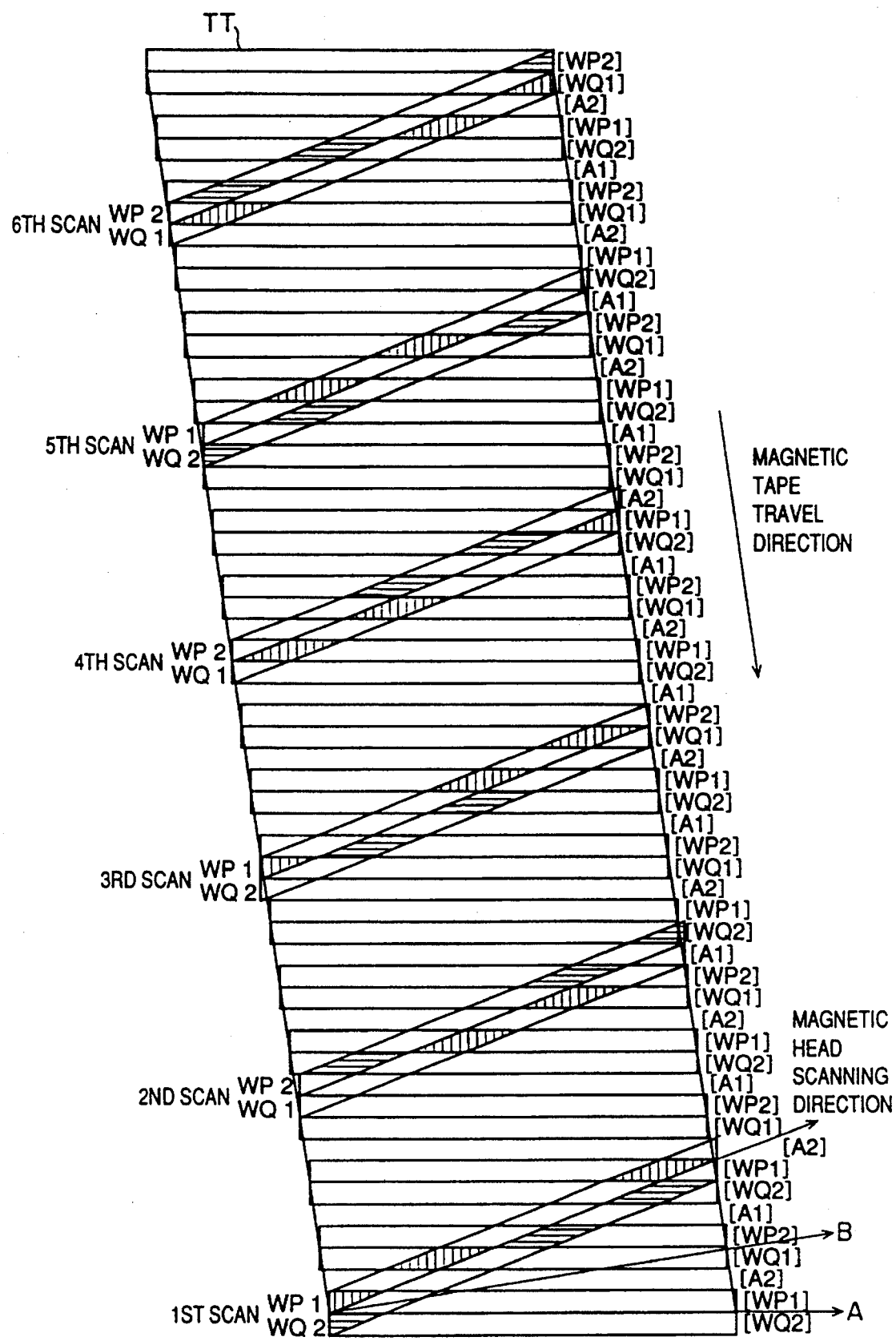
FIG. 6 is a tape pattern diagram for assistance in explaining the forward-direction variable speed reproduction of a first embodiment of the video signal reproducing method according to the present invention.

Here, if the magnetic tape travel speed is increased by N±m/M times and the number of tracks crossed by the magnetic heads in one scanning is denoted by X, $$X=7 \tag{1}$$

in the case of the (3+⅓) time magnetic tape travel speed in the positive direction (as shown in FIG. 6) and in the case of the (1+⅓) times speed in the negative direction (as shown in FIG. 7). Further, although the tracks to be scanned immediately after the scanning end and immediately before the scanning start are triangular in shape sometimes, since the area is ½ of the rhombic (diamond) shape obtained in the ordinary scanning, an addition of two tracks to be scanned immediately after the scanning end and immediately before the scanning start is assumed to be one track in both.

Then, the number X of the tracks can be expressed by the following formula (2) in the case of the positive direction and by the following formula (3) in the case of the negative direction as follows:

$$X=3(N\pm m/M-1) \tag{2}$$

$$X=3(N\pm m/M+1) \tag{3}$$

where N, M and m are all natural numbers, and M>m.

The reason why the number of tracks X can be decided in accordance with the above formulae (2) and (3) is that three tracks are recorded simultaneously per field in recording.

FIGS. 6 and 7 are the tape patterns obtained when video signals recorded on a magnetic tape having a reference track width are reproduced by a magnetic head having a head width equal to the reference track width. On the other hand, the reproduced signals obtained when the magnetic head direction is the positive direction and the magnetic tape travel speed is 3+⅓ times higher than that in recording will be explained with reference to a timing chart shown in FIG. 8A to 8F, and the reproduced signals obtained when the magnetic head direction is the negative direction and the magnetic tape travel speed is 1+⅓ times higher will be explained with reference to a timing chart shown in FIG. 9A to 9F, respectively. Here, the reference track width indicates the normal track width on the tape pattern obtained in the ordinary recording. In the case of this embodiment, the track widths of the audio track and two video tracks are all equal to the reference track width, for instance as about 19 μm.

FIGS. 8A, 8D, 9A and 9D indicate the envelops of the first reproduction signals reproduced by the magnetic heads WP1 and WP2; and FIGS. 8B, 8E, 9B and 9E indicate the envelops of the second reproduction signals reproduced by the magnetic heads WQ1 and WQ2, which correspond to the shaded portions in FIGS. 6 and 7 (at which the azimuth angles match each other). Further, FIGS. 8C, 8F, 9C and 9F indicate the cases where the first and second reproduction signals are reproduced simultaneously, in which when the envelop (e.g., the reproduction signal level) exceeds a predetermined threshold value, the level is shown as a high level and when the envelop does not exceeds the threshold level, the level is shown as a low level. When ½ of the period during which the magnetic head crosses the same azimuth track is determined as one unit period, the high level periods (at which the first and second reproduction signals are reproduced simultaneously) appear for each six unit period, as shown by FIGS. 8C, 8F, 9C and 9F. This is because the azimuth angle of the tape pattern is repeated at a period of 6 tracks. Therefore, without being limited only to the (3+⅓) time speed in the positive direction or the (1+⅓) time speed in the negative direction, the above formulae (2) and (3) can be established at any given magnetic tape travel speeds. Further, the high level periods (at which the first and second reproduction signals are reproduced simultaneously) can be generated by the magnetic heads the same as used for recording, irrespective of the positive and negative directions of the magnetic tape travel directions.

Figure 5:
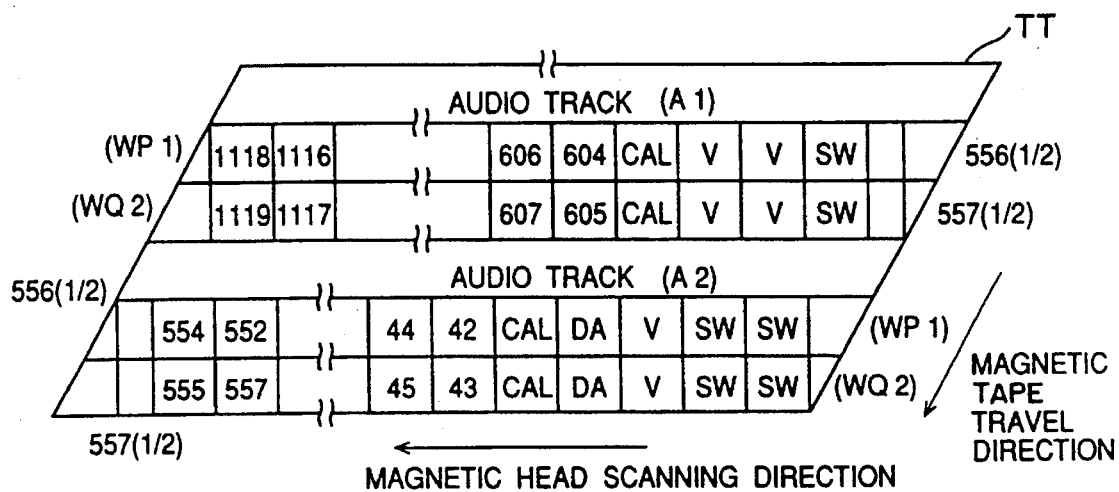
FIG. 5 is a tape pattern diagram for assistance in explaining the line numbers.

Further, the first and second reproduction signals reproduced simultaneously are signals related to the chrominance signals PB and PR. Although the sorts of these signals are different from each other, these first and second reproduction signals are important because being related to the lines adjacent to each other for constituting one picture (as already explained with reference to FIG. 5). In addition, the two signals obtained at the simultaneous reproduction timing are signals recorded by the same magnetic head on the basis of the relationship between the azimuth angle and the tape pattern, there exists such an advantage that it is unnecessary to discriminate the segments.

Here, the cases where the magnetic tape travel speed in the variable speed reproduction is even-number times or odd-number times higher than that in the recording will be studied with reference to FIGS. 10A to 10C, 11A and 11B. First, when the signals are reproduced at an even-number time speed, in the above-mentioned formulae (2) and (3), m/M=0, and N=2n (n: any given natural number). Therefore, the formulae (2) and (3) can be replaced with the following formulae (4) and (5), respectively:

$$X=3(2n-1) \quad (4)$$

$$X=3(2n+1) \quad (5)$$

Here, in the first and second scanning, when the 6 unit period (at which the first and second reproduction signals are reproduced simultaneously) are taken into account, the relationship between both can be specified by a residual obtained by dividing the number X of the tracks by 6. In other words, the residual represents an offset between the first and second scanning.

Here, if A MOD B indicates a residual obtained by dividing A by B, X MOD 6=3 in accordance with the formulae (4) and (5). This indicates that the first scanning and the second scanning are offset from each other by 3 unit period, irrespective of the magnetic tape travel direction. Therefore, as shown in FIGS. 10A to 10C, the timing at which the first and second reproduction signals are reproduced simultaneously cannot be obtained for three unit period for each scanning (the period T1), even if the other third and fourth scannings are repeated, with the result that noise bars are generated. Therefore, in the case of the even-number time variable reproduction speed, since noise bars are generated irrespective of the magnetic tape travel direction, it is not appropriate to execute the even-number time variable speed reproduction.

Next, the case where the magnetic tape travel speed in the variable speed reproduction is odd-number times higher than that in recording will be studied with reference to FIGS. 11A and 11B. First, when the signals are reproduced at an odd-number time speed, in the above-mentioned formulae (2) and (3), m/M=0, and N=2n+1 (n: any given natural number). Therefore, the formulae (2) and (3) can be replaced with the following formulae (6) and (7), respectively:

$$X=6n \quad (6)$$

$$X=6(n+1) \quad (7)$$

Here, in the case where the magnetic tape is driven in the positive direction, X MOD 6=0 in accordance with the formulae (6) and (7). In this case, since the reproduction timings of the first and second scannings match each other, even if the third and fourth scannings are repeated, it is impossible to obtain the first and second reproduction signals simultaneously during the period T2 as shown in FIG. 8B, with the result that noise bars are generated.

Here, an appropriate variable reproduction speed will be explained with reference to FIGS. 12A to 12F and 13A to 13H. As shown in FIGS. 12A to 12F, in the case where X MOD 6=1, since the simultaneous reproduction timing is offset by one unit period for each scanning, it is possible to reproduce all the signals for one picture by 6 scannings. Therefore, the variable reproduction speed at which X MOD 6=1 can be satisfied will be obtained hereinbelow. Now, when ±1 of any given variable reproduction speeds are taken into account with the odd-number speed as the reference, the any given variable reproduction speed can be expressed by 2n+1±m/M (m/M ≧1), so that the formulae (2) and (3) can be expressed as $$X=3(2n±m/M)=6n±(3m)/M \quad (8)$$

$$X=3(2n+2±m/M)=6(n+1)±(3m)/M \quad (9)$$

where m/M≧1.

Further, since X MOD 6=±(3m)/M=1, irrespective of the magnetic tape travel direction, ±m/M=⅓. Therefore, when the variable reproduction speed is (2n+1±⅓) times higher than that in recording, it is possible to form one picture by the minimum possible number of scannings and further to obtain smooth reproduced picture.

Further, when X MOD 6=0.75 as shown in FIGS. 13A to 13H, since the timings of simultaneous reproductions are offset from each other being partially overlapped with each other for each scanning, in this case it is also possible to reproduce all the signals for one picture. Further, when taking into account the partial overlap, the following formula can be obtained as $$0 < X \; MOD \; 6 < 1 \quad (10)$$

The above formula (10) indicates that if the variable reproduction speed is 2n+1±m/M and further 0<m/M<⅓, one picture can be formed by 6/S (S=X MOD 6) scannings, and further it is possible to realize noiseless variable speed reproduction, irrespective of the magnetic tape travel direction.

(Second embodiment)

In the above-mentioned first embodiment, signals recorded on a magnetic tape having a reference track width are reproduced by a magnetic head having a head width equal to the reference track width. However, when signals recorded on a magnetic tape having the reference track width are reproduced by a magnetic head having a head width wider than the reference track width, since long reproduced signal envelops can be obtained, it is possible to increase the allowable value (tolerance) of the variable reproduction speed. Accordingly, in this second embodiment, the variable reproduction speed will be studied of the case where the head width QW of the magnetic head is QW (>0) times wider than the reference track width W. Further, since X MOD 6 is the same in both the positive and negative directions, the following description will be made by taking the case of the positive magnetic tape travel direction. However, the following description can be of course applied to the case of the negative magnetic tape travel direction.

In FIG. 14, the assumption is made that a track TA of the same azimuth angle are scanned by a first magnetic head H1 having a head width W (the same as the reference track width) and a second magnetic head H2 having a head width QW at the same variable reproduction speed. In this case, the first magnetic head H1 reproduces signals in the rhombic area enclosed by thick lines in FIG. 14, and the reproduction period t1 can be expressed as $$t1=2a/v=(2W)/(v \text{ SIN } \theta) \quad (11)$$

where v denotes a relative speed.

On the other hand, the second magnetic head H2 reproduces signals in the rhombic area enclosed by dashed lines in FIG. 14, and the reproduction period t2 can be expressed as $$t2=(a+b)/v=\{(1+Q)W\}/(v \text{ SIN } \theta) \quad (12)$$

where v denotes the relative speed.

On the basis of the formulae (11) and (12), t2/t1=(1+Q)/2. Therefore, when signals recorded on a magnetic tape having a reference track width W are reproduced by a magnetic head having a head width Q times wider than the reference track width W, it is possible to reproduce signals during the period the (1+Q)/2 times longer than the case where signals recorded on a magnetic tape having a reference track width are reproduced by a magnetic head having the head width equal to the reference track.

Therefore, as shown in FIG. 15B, the period during which the first and second reproduction signals are reproduced simultaneously can be increased by (1+Q)/2 times, as compared with the case where signals recorded on the magnetic tape are reproduced by the magnetic head having the head width equal to the track width as shown in FIG. 15A.

Accordingly, in the same way as with the case of the first embodiment, if the variable reproduction speed is 2n+1±m/M (m/M≦1), in the case of X MOD 6=±(3m)/M=(1+Q)/2, one picture can be obtained by 12/(1+Q) scannings; that is, ±m/M=(1+Q)/6 is the required condition.

Further, the above formula (10) can be replaced with the following formula:

$$0<X \text{ MOD } 6<(1+Q)/2 \quad (13)$$

If 0<m/M<(1+Q)/6 is satisfied on the basis of the formula (13), since the simultaneous reproduction timings are offset while being partially overlapped with each other, in this case it is possible to reproduce all the signals for one picture.

Here, the noiseless variable reproduction speed at which one picture can be formed by 5 scannings will be explained with reference to FIG. 16A to 16E. In the first embodiment, since the track width is equal to the head width, 6 scannings are required at the minimum for constituting one picture. In this second embodiment, however, since the head width is determined Q times wider than the track width, it is possible to constitute one picture by 5 or less scannings. FIG. 16 indicates the timings at which the first and second signals are reproduced simultaneously when the magnetic head width is equal to the reference track width, and FIGS. 16B to 16F indicate the timing chart for constituting one picture by 5 scannings with the use of the magnetic head having a Q-time width. The respective offset for each scanning can be expressed as $$X \text{ MOD } 6=\pm(3m)/M=(1+Q)/2 \quad (14)$$

Further, since signals for 6 unit period can be reproduced by 5 scannings, the following formula can be obtained $$5(1+Q)/2=6 \quad (15)$$

On the basis of the above formulae (14) and (15), Q=1.4 and ±m/M=2/5. Therefore, when the variable speed reproduction is made with the use of the magnetic head having a head width 1.4 time wider than the track width at (2n+1±2/5) time speed, it is possible to constitute one picture by 5 scannings and further to obtain noiseless reproduction picture. Further, when the variable speed reproduction is made with the use of the magnetic head having a head width more than 1.4 time at (2n+1±2/5) time speed, since the simultaneous reproduction timings are partially overlapped for each scanning, it is of course possible to constitute one picture by 5 scannings.

(Third embodiment)

In the above-mentioned second embodiment, the allowable value of the variable reproduction speed can be increased by taking into account that the reproduction envelop can be obtained for a long time when signals recorded on a magnetic tape having a reference track width are reproduced by a magnetic head having a head width Q times wider than the reference track width. On the other hand, even where the track width formed on the magnetic tape is determined wider than the reference track width, long reproduced envelops can be obtained. In this third embodiment, the variable reproduction speed will be obtained when signals recorded on a magnetic tape having a track width P times wider than the reference track width are reproduced by a magnetic head having a head width the same as the reference track width.

In FIG. 17, a magnetic tape having a reference track width W and a magnetic tape having a track width PW are scanned by using a first magnetic head H1 having a head width W (the same as the reference track width). First, where the magnetic tape having the reference track width W is scanned, the first magnetic head H1 reproduces signals recorded in a rhombic area enclosed by thick lines shown in FIG. 17, and the reproduction period t1 can be expressed by the formula (11), as already explained in the second embodiment:

$$t1=2a/v=(2W)/(v \text{ SIN } \theta) \quad (11)$$

On the other hand, where the magnetic tape having a track width PW is scanned, the first magnetic head H1 reproduces signals recorded in a rhombic area enclosed by dashed lines shown in FIG. 17, and the reproduction period t3 can be expressed as follows:

$$t3=(a+c)/v=((1+P)W)/(v \text{ SIN } \theta) \quad (16)$$

In accordance with the formulae (11) and (16), $t3/t1=(1+P)/2$ can be obtained. Therefore, when the magnetic tape having a track width P (>0) times wider than the reference track width are reproduced by the magnetic head having a head width equal to the reference track width, it is possible to obtain a reproduction period $(1+P)/2$ times longer than that obtained when signals recorded on the magnetic tape having the reference track width are reproduced by the magnetic head having the same head width.

Accordingly, as shown in FIG. 18B, the period during which the first and second reproduction signals are reproduced simultaneously can be also increased by $(1+P)/2$ times longer than that obtained when signals recorded on the tape are reproduced by the magnetic head having a head width the same as the track width, as shown by FIG. 18A.

Therefore, in the same way as with the case of the first embodiment, if the variable reproduction speed is $2n+1\pm m/M$ ($m/M\leq 1$), in the case of X MOD $6=\pm(3m)/M=(1+P)/2$, one picture can be obtained by $12/(1+P)$ scannings; that is, $\pm m/M=(1+P)/6$ is only required.

Further, the above formula (10) can be replaced with the following formula $$0<X \text{ MOD } 6<(1+P)/2 \quad (17)$$

If $0<m/M<(1+P)/6$ is satisfied on the basis of the formula (17), since the simultaneous reproduction timings are offset being partially overlapped with each other, in this case it is possible to reproduce all the signals for one picture.

Further, the variable reproduction speed at which the noiseless variable reproduction is realized by constituting one picture by 5 scannings can be considered in the same way as with the case of the first embodiment. That is, $P=1.4$ and $\pm m/M=2/5$. Therefore, when the variable speed reproduction is made with the use of the magnetic head having a head width 1.4 time wider than the track width at $(2n+1\pm 2/5)$ time speed, it is possible to constitute one picture by 5 scannings and further to obtain the reproduction picture without generating noise bars. Further, when the variable speed reproduction is made with the use of the magnetic head having a head width more than 1.4 time at $(2n+1\pm 2/5)$ time speed, since the simultaneous reproduction timings are partially overlapped for each scanning, it is of course possible to constitute one picture by 5 scannings.

(Fourth embodiment)

In this fourth embodiment, the second and third embodiments are combined with each other; that is, the variable reproduction speed will be obtained when signals recorded on a magnetic tape having a track width P times wider than the reference track width are reproduced by a magnetic head having a head width Q times wider than the reference track width.

In FIG. 19, the assumption is made that the magnetic tape having the reference track width W is scanned by a first magnetic head H1 having a head width W (the same as the reference track width) and a magnetic tape having a track width PW is scanned by a second magnetic head H2 having a head width QW. In the former case, the first magnetic head H1 reproduces signals in the rhombic area enclosed by the thick lines in FIG. 19, and the reproduction period t1 can be expressed in the same way as with the case of the second embodiment as $$t1=2a/v=(2W)/(v \text{ SIN } \theta) \quad (11)$$

where v denotes a relative speed.

On the other hand, the second magnetic head H2 reproduces signals in the rhombic area enclosed by dashed lines in FIG. 19, and the reproduction period t4 can be expressed as $$t4=(b+c)/v=\{(Q+P)W\}/(v \text{ SIN } \theta) \quad (18)$$

where v denotes a relative speed.

On the basis of the formulae (11) and (18), $t4/t1=(Q+P)/2$. Therefore, when signals recorded on a magnetic tape having a track width P times wider than the reference track are reproduced by a magnetic head having a head width Q times wider than the reference track width, it is possible to reproduce signals at the $(Q+P)/2$ time period, as compared with one unit period (the case where signals recorded on a magnetic tape having a reference track width are reproduced by a magnetic head having the head width equal to the reference track). Therefore, as shown in FIG. 20B, the period during which the first and second reproduction signals are reproduced simultaneously can be increased as $(Q+P)/2$ times longer than that obtained when signals recorded on the magnetic tape are reproduced by the magnetic head having a head width the same as the track width as shown in FIG. 20A. Accordingly, in the same way as with the case of the first embodiment, if the variable reproduction speed is $2n+1\pm m/M$ ($m/M\leq 1$), in the case of X MOD $6=\pm(3m)/M=(Q+P)/2$, one picture can be obtained by $12/(P+Q)$ scannings; that is, $\pm m/M=(1+Q)/6$ is only required.

Further, the above formula (10) can be replaced with the following formula $$0<X \text{ MOD } 6<(Q+P)/2 \quad (19)$$

If $0<m/M<(Q+P)/6$ is satisfied on the basis of the formula (19), since the simultaneous reproduction timings are offset being partially overlapped with each other, in this case it is possible to reproduce all the signals for one picture.

Here, the case where signals are recorded on a magnetic tape having a head width Q times wider than the reference track and then reproduced at variable speed reproduction will be considered. As already explained, when the lower edges of the magnetic heads WP1 and WP2 and the upper edges of the magnetic heads WQ1 and WQ2 are arranged at the same height level, since the Q-time head width is assumed to obtain, the track width related to video signals is increased and the track width related to audio signals is decreased.

Further, if Q=P in the formula (19), the following formula can be obtained $$0<X \text{ MOD } 6<Q \quad (20)$$

Here, if the variable reproduction speed is $2n+1\pm m/M$ ($m/M\leq 1$), as far as $0<m/M<Q/3$ is satisfied on the basis of the formula (19), since the simultaneous reproduction timings are offset being partially overlapped with each other, in this case it is possible to reproduce all the signals for one picture. Further, in the case of $m/M=Q/3$, all the signals for one picture can be reproduced by $6/Q$ scannings, and thereby a smooth picture can be obtained.

Further, when the one picture is constituted by 5 scannings, in the same way as explained in the second embodiment with reference to FIG. 12, the offset for each scanning can be expressed as $$X \text{ MOD } 6=\pm(3m)/M=Q \quad (21)$$

Here, since signals for 6 unit period can be reproduced by 5 scannings, the following formula can be obtained $$5Q=6 \tag{22}$$

On the basis of the formulae (21) and (22), Q=1.2 and ±m/M=2/5 can be obtained. Therefore, when signals are recorded on the magnetic tape by the magnetic head having a head width 1.2 times wider than the reference track width and then reproduced at variable speed of 2n+1±2/5 times, since one picture is constituted by 5 scannings, it is possible to obtain reproduced picture having no noise bars. Further, when signals are recorded with the magnetic head having a head width more than 1.2 times and then reproduced at the variable speed of (2n+1±2/5) times, since the simultaneous reproduction timings are offset being partially overlapped with each other, it is of course possible to reproduce one picture by 5 scannings.

In the first to fourth embodiments, the fact that noiseless variable speed reproduction can be obtained within the range of 0<X MOD 6≦[(Q+P)/2]; that is, <0 m/M≦[(Q+P)/6] has been explained. Here, in the first embodiment, Q=P=1; in the second embodiment, P=1; and in the third embodiment, Q=1, respectively. In these embodiments, the simultaneous reproduction timings are offset for each scanning being partially overlapped with each other or in the vicinity thereof.

In the fifth and sixth embodiments as explained below, however, the simultaneous reproduction timings are offset from each other between the current scanning and the succeeding scanning, without being offset under partial overlapped conditions with each other or in the vicinity thereof for each scanning; that is, all the signals for one picture can be reproduced in the same way as with the case of interlaced scanning in a TV set.

In other words, the case where X MOD 6>1; that is, m/M>⅓ or X MOD 6>(Q+P)/2; that is, m/M>(Q+P)/6 will be explained hereinbelow.

In these embodiments, all the signals for one picture can be reproduced at intervals of the simultaneous reproduction timing for each scanning, as with the case of the interlaced scanning in a TV set.

(Fifth embodiment)

This fifth embodiment corresponds to the first embodiment, in which signals recorded on a magnetic tape having a reference track width is reproduced by a magnetic head having a head width equal to the reference track width and in addition the simultaneous reproduction timings are produced at predetermined intervals for each scanning. In the above-mentioned case, when the variable reproduction speed is 2n+1±m/M, the conditions for realizing noiseless reproduction will be determined hereinbelow with reference to FIGS. 21A to 24G.

When S=X MOD 6 (=±(3m)/M), S>1 indicates that there exists a time gap (S-1) between the first and second scannings, as shown in FIGS. 21A and 21B. This time gap must be buried by the scannings after the third scannings. Here, when one period is determined as an interval until the first scanning and the simultaneous reproduction timings match each other, if the time gap can be buried within one period, it is possible to reproduce signals without generating noise bars.

Here, this will be explained by taking into account that the simultaneous reproduction timing itself has a period of 6 unit time intervals with reference to FIGS. 22A to 22E. FIGS. 22A and 22B indicate that there exists a time offset S in the simultaneous timing between the first scanning and the second scanning, so that a time gap S-1 is produced.

Further, FIG. 22D indicates the n-th scanning, which produces the third simultaneous reproduction timing most adjacent to the second simultaneous timing after 6 unit periods have elapsed after the first simultaneous reproduction timing of the first scanning. Further, if the timing offset between the second simultaneous reproduction timing and the third simultaneous reproduction timing is denoted by U, the overlapped portion can be produced at a time interval (1-U). Further, U can be determined by the following formula (23).

$$U=6 \text{ MOD } S \tag{23}$$

where 6=S·L±U, and L is an integer of 1 or more.

On the other hand, there exists a time gap between the third simultaneous reproduction timing (related to the n-th scanning as shown in FIG. 22D) and the fourth simultaneous reproduction timing (related to the (n−1)th scanning as shown in FIG. 22C), which causes a noise bar (S−1). Here, since there exists a time gap U between the fourth simultaneous reproduction timing (related to the (n−1)th scanning as shown in FIG. 22C) and the fifth simultaneous timing (related to the 2n-th scanning as shown in FIG. 22E, in the same way as that between the second simultaneous reproduction timing (related to the first scanning) and the third simultaneous reproduction timing (related to the n-th scanning), it is possible to bury the time gap (S−1). Since the above time gaps are repeated, the time gaps (S−1) can be buried perfectly, so that it is possible to constitute one picture having no noise bars.

However, in order to bury the sequential time gaps, it is necessary that the second simultaneous reproduction timing and the third simultaneous reproduction timing are partially overlapped with each other. Therefore, the conditions for constituting one picture having no noise bars can be expressed as $$1-U \geqq 0 \tag{24}$$

Further, when U=0, since the period is closed by 6 unit period, it is impossible to constitute one picture. This corresponds to the case where the tape travel speed is even-number times or odd-number times higher than the recording speed as in the first embodiment, as already explained with reference to FIGS. 10A to 11B, respectively Further, another example will be explained with reference to FIGS. 23A to 23E, in which m/M=½. Since S=3m/M, and S=3/2. Therefore, U=0, as shown in FIG. 19, noise bars remain. Further, the period T can be obtained as T=6/S.

Further, the following formula can be derived from (1-U)≧0:

$$0<U\leqq 1 \tag{25}$$

In this case, the period can be obtained on the basis of the offset rate U as T=6/U. By substituting this into the formula (25), the following formula can be obtained:

$$0<6/T\leqq 1 \tag{26}$$

As a result, if T≧6, one picture can be constituted.

Another example of m/M=4/7 will be explained with reference to FIGS. 24A to 24G. The offset rate for each scanning is S=12/7, so that U=6/7. Therefore, it is possible to constitute one picture at the period T=7 having an overlap of (1-U)=1/7.

Here, if ST=6k, S=6k/T. Therefore, m/M=2k/T (if S>1 and further T≧6, k≧S). Further, when S≦1, k=1 and thereby ST=6 can be established.

(Sixth embodiment)

The six embodiment corresponds to the fifth embodiment, in which signals recorded on a magnetic tape having a track width P times wider than the reference track width are reproduced by a magnetic head having a track width Q times wider than the reference track width, and further there exists a time interval between the simultaneous reproduction timings for each scanning. Here, when the variable reproduction speed is increased by $(2n+1\pm m/M)$ times, the conditions for realizing the noiseless reproduction will be obtained hereinbelow. When the fourth embodiment is applied to the fifth embodiment, the sixth embodiment can be obtained. In the same way as with the case of the fourth embodiment, one unit period of the simultaneous reproduction timing period can be increased by $(P+Q)/2$ times. Accordingly, it is possible to consider that 6 unit period of the simultaneous reproduction timing period can be increased by $2/(P+Q)$ times. Therefore, the formula (23) as explained in the fifth embodiment can be expressed as $$U=6(2/(P+Q)) \text{ MOD } S \qquad (27)$$

On the other hand, the conditions for constituting one picture having no noise bars is $0<U\leq 1$ on the basis of $-U\geq 0$, in the same way as with the case of the fifth embodiment.

Further, in the same way as in the fifth embodiment, the period can be obtained on the basis of the offset rate U. The period $T=6\ (2/(P+Q))/U$, so that $0<12/\ ((P+Q)\cdot T)\leq 1$. As a result, if $T\geq 12/(P+Q)$, one picture can be constituted. FIGS. 25A to 25E show the case where $m/M=4/5$ and therefore $P=Q=1.2$, in which $T=5$.

In summary, if the variable reproduction speed is $2n \ 1\pm m/M$, $s=X \text{ MOD } 6=\pm(3m)/M$ $U=6\cdot(2/(P+Q)) \text{ MOD } S$ $0<U\leq 1$ Therefore, the noiseless conditions are as follows:

$$0<12/(P+Q) \text{ MOD } (3m)/M \leq 1 \qquad (28)$$

Further, form another point of view, the noiseless conditions can be obtained as follows:

$$T\geq 12/(P+Q) \qquad (29)$$

where $m/M=2k/T$; T and M are an integer of 2 or more; k is an integer of 1 or more; and $M>m$ (a prime number, respectively).

Further, in order to obtain the conditions corresponding to the first embodiment, P and Q in the formulae (28) and (29) are set to $P=Q=1$. Further, in order to obtain the conditions corresponding to the second embodiment, P in the formulae (28) and (29) is set to $P=1$. Further, in order to obtain the conditions corresponding to the third embodiment, Q in the formulae (28) and (29) is set to $Q=1$.

In the variable speed reproduction having constant time intervals in the obtained video information, it is possible to obtain the variable speed reproduction picture which is smoother in visual point of view, when the time intervals are buried discontinuously, as with the case of the interlaced scanning of TV.

(Seventh embodiment)

Figure 26:
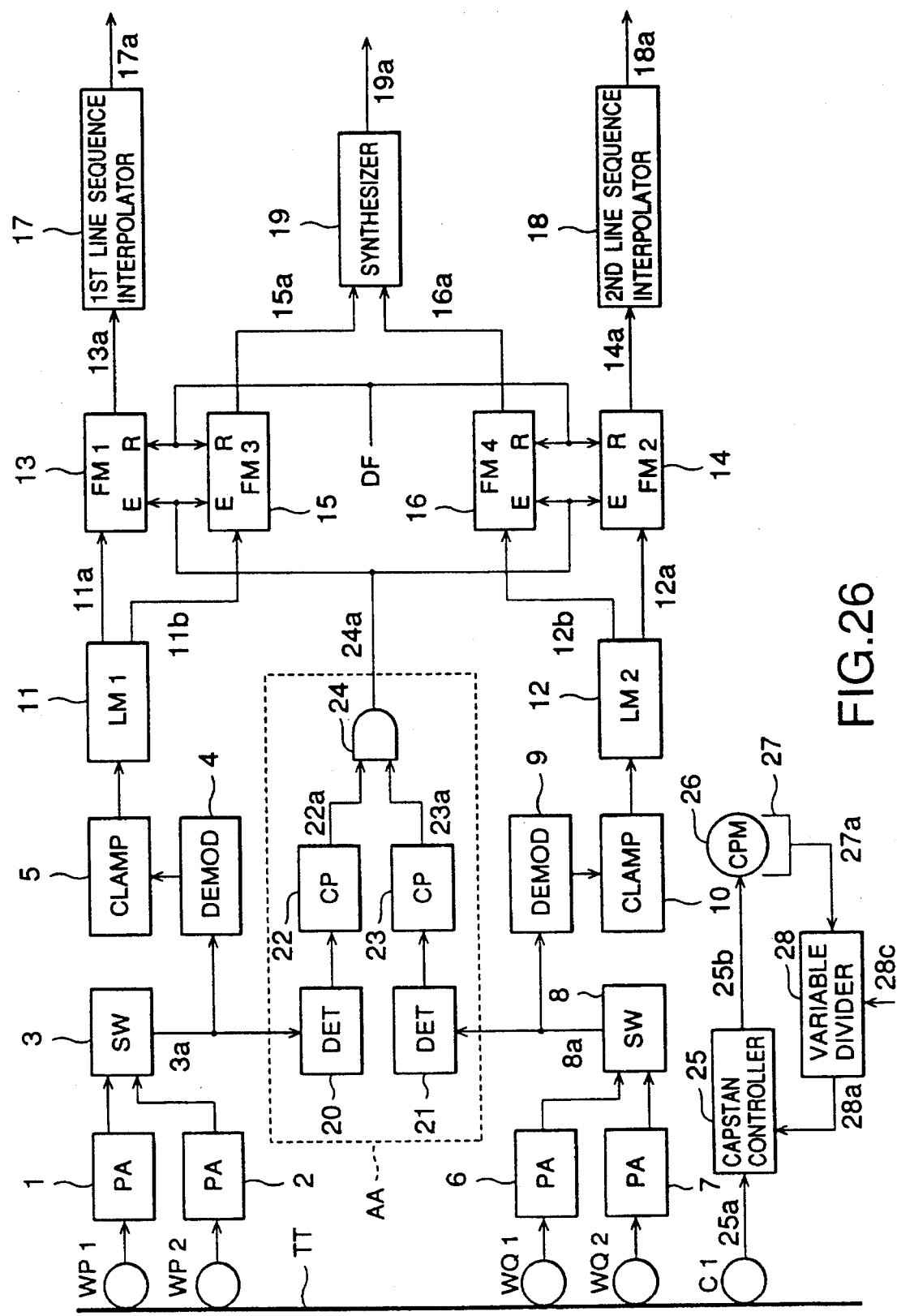
FIG. 26 is a block diagram showing an embodiment of the video signal reproducing apparatus according to the present invention.

With reference to FIG. 26, a video signal reproducing apparatus for realizing the first to sixth embodiments of the video signal reproducing methods according to the present invention will be described hereinbelow. Here, as already explained with reference to FIG. 1, the audio heads A1 and A2, the video heads WP1 and WP2 and the video heads WQ1 and WQ2 are arranged around a rotary drum opposingly at 180 degree angular distance away from to each other, respectively so as to have different azimuth angles between the two heads. Further, the azimuth angles of the video heads WP1 and WQ1 are equal to each other, and the azimuth angles of the video heads WP2 and WQ2 are equal to each other. On the other hand, the audio heads A1 and A2 have an azimuth angle difference from those of the video heads, respectively. In FIG. 26, chrominance signals PR and PB and luminance signal Y are reproduced from a magnetic tape TT in time-axis compressed mode through the magnetic heads WP1 and WP2, respectively, and after that amplified to predetermined signal levels through preamplifiers 1 and 2, respectively. These preamplified signals are supplied to selectors 3 for selecting any one of these signals as a first reproduction signal 3a in synchronism with the revolution period of the rotary drum (rotary head). The selected first reproduction signal 3a is demodulated by a demodulator 4 for FM demodulating the signals, then supplied to a clamp 5 for clamping the FM-demodulated signal at a predetermined dc-potential level, and further given to a first line memory 11 via an A/D converter (not shown). On the other hand, chrominance signals PR and PB and luminance signal Y are reproduced from the magnetic tape TT in time-axis compressed mode through the magnetic heads WQ1 and WQ2, respectively, processed in the same way, and then supplied to a second line memory 12. The functions of elements 6 to 10 in FIG. 26 are the same as those of the elements 1 to 5, respectively, so that the description thereof is omitted herein.

The first and second line memory means 11 and 12 extend the time-axis compressed chrominance signals PR and PB to the original time axis, respectively. The extended signals 11a and 12a are supplied to a first frame memory 13 and a second frame memory 14, respectively. Further, the first and +second line memories 11 and 12 extend the time-axis compressed luminance signal (Y) related to the even number lines or the time-axis compressed luminance signal (Y) related to the odd number lines to the original time axis, respectively. The extended signals 11b and 12b are supplied to a third frame memory 15 and a fourth frame memory 16, respectively.

These first to fourth frame memories 13 to 16 are controlled on the basis of a first control signal 24a (described later) and a second control signal DF (a phase signal given by a drum servo-circuit not shown) synchronized with one period (one revolution) of the rotary drum (which is the same as two scannings of the magnetic heads). Further, in these frame memories, write addresses are reset in response to a rise edge of the second control signal DF; the write address is incremented in response to a write clock (not shown); and write enable is set when the first control signal 24a is kept at a high level. Further, the signals are read in response to a fixed clock signal (not shown).

Here, a control signal generating circuit AA for generating the first control signal 24a will be described in detail. The first and second reproduction signals 3a and 8b are supplied to detectors 20 and 21, respectively, by which each envelop of the input signal is detected by rectifying both-waves of the input signal and further by passing the rectified signal through a low-pass filter for extracting low-band frequency components. The detected results are supplied to comparators 22 and 23 for comparison with a predetermined threshold level, respectively. When higher than the predetermined threshold level, high-level first and second detection signals 22a and 23a are supplied to an AND circuit 24, and when lower than the predetermined threshold level, low-level first and second detection signals 22a and 23a are supplied to the AND circuit 24. The AND circuit 24 obtains logical product of both to generate the first control signal 24a (which corresponds to the signal shown in FIGS. 8C and 8F).

During the period when this first control signal 24a is at the high level, the first and second reproduction signals 3a and 8a are reproduced at a level higher than the threshold level. Further, when the both signals 3a and 8a are reproduced simultaneously, the first and second reproduction signals 3a and 8a are at the high-level, at which the S/N ratio is excellent. Further, under these conditions; that is, during this period, the chrominance signals PB and PR related to the first and second reproduction signals 3a and 8a are located on two adjacent lines.

Further, only when the first control signal 24a is at the high level, since signals are written in the first to fourth frame memories 13 to 16, if the head widths of the magnetic heads WP1, WP2, WQ1 and WQ2 are so determined as to satisfy the conditions of the first and second embodiments and further the variable reproduction speed is set, it is possible to store one picture in the first to fourth frame memories 13 to 16, by a predetermined number of scannings.

Further, in the case of the variable speed reproduction, when the segment to which the currently reproduced signal belongs is not discriminated, the signals (e.g., the chrominance signals PB and PR) cannot be processed for each segment. However, in the period when the first control signal 24a is at the high level, since the signals are reproduced by the same magnetic heads as in recording as shown in FIG. 6, it is unnecessary to discriminate the segments. Therefore, it is not necessary to insert the signal for discriminating the segments several times into one track, so that there exists such an advantage that the recording medium can be utilized efficiently.

The chrominance (PR) signal 13a and the chrominance (PB) signal 14a read from the first and second memories 13 and 14, respectively are supplied to first and second line sequence interpolators 17 and 18, respectively. The interpolators 17 and 18 interpolate the chrominance signals PR and PB on the basis of the front and rear lines in sequence, respectively, and generate an output chrominance (PR) signal 17a and an output chrominance (PB) signal 18a, respectively. These generated signals 17a and 18a are transmitted through transmission paths (not shown), respectively.

On the other hand, the luminance (Y) signal 15a related to the odd-number lines and read from the third frame memory 15 and the luminance (Y) signal 16a related to the even-number lines and read from the fourth frame memory 16 are supplied to a synthesizer 19. In the synthesizer 19, the two luminance signals are combined in accordance with the normal sequence, further the timings of the output chrominance (PR) signal 17a and the output chrominance (PB) signal 19a are adjusted, and the combined and timing-adjusted signal is outputted as the output luminance (Y) signal 19a through a transmission path (not shown).

Here, the capstan servo mechanism for deciding the variable speed reproduction will be described hereinbelow. A control signal 25a can be reproduced from the magnetic tape TT by use of a control head C1 in synchronism with the revolution period of the drum. The reproduced control signal 25a is supplied to a capstan controller 25 to output a drive signal 25b (described later). The outputted drive signal 25b is given to a capstan motor 26 to drive the motor 26. The revolution speed of the capstan motor 26 is detected by a detector 27 (i.e., a frequency generator) for generating a predetermined number of pulses for each revolution. The detected signal 27a is supplied to a variable divider 28.

The variable divider 28 divides the detected signal 27a to decide the magnetic tape travel speed required for the variable speed reproduction, as explained in the first to sixth embodiments, that is, a division ratio which corresponds to a speed $(2n+1\pm m/M)$ times higher than the recording speed. A divided signal 28a is supplied to the capstan controller 25. The capstan controller 25 compares the detected signal 28a with the control signal 25a in phase, and generates the drive signal 25b on the basis of an error signal between both to control the capstan motor 26.

Further, in the above-mentioned embodiments, the description has been made on condition that the magnetic tape travel speed is synchronized with the angular phase of the rotary drum during the variable speed reproduction. Without being limited thereto, however, as far as the conditions of the magnetic tape travel speed and the head width as stated in the first and second embodiments can be satisfied, it is unnecessary that the magnetic tape travel speed is synchronized with the angular phase of the rotary drum. In this case, however, the reproduced picture is rewritten on the display to such an extent as to be recognizable according to the phase shift due to a difference between the magnetic tape travel speed and the angular phase of the rotary drum. For instance, a rewritten border is detected in such a way as to flow from the upper side to the lower side on the display. However, although the number of scannings increases due to asynchronism, since one picture can be constituted securely, a reproduced picture having no noise bars can be obtained. Therefore, this method is suitable in particular when the above-mentioned threshold level is set to a high level to take the S/N ratio into account more severely.

Further, in the above-mentioned embodiments, although the magnetic heads WP1 and WQ2 and the magnetic heads WP2 and WQ1 are mounted at roughly the same angular positions as shown in FIG. 1, it is of course possible to mount the magnetic heads WQ2 a predetermined angular distance away from the magnetic head WP1, and the magnetic heads WQ1 a predetermined angular distance away from the magnetic head WP2. In this case, the first reproduction signal 3a is supplied to the detecting means 20 being delayed by a period corresponding to the predetermined angular distance. Further, delaying means for delaying the signals by a period corresponding to the predetermined angular distance are interposed between the magnetic heads WP1 and WP2 and the first and third frame memories 13 and 15, respectively. In other words, in the first to fifth embodiments, although the output video signals are generated on the basis of the first and second simultaneous reproduction signals, where the magnetic heads are arranged being spaced away from each other as described above, it is possible to consider that the output video signals can be generated on the basis of the first and second reproduction signals reproduced from the adjacent positions on the magnetic tape.

Further, the video signal reproducing apparatus as described above in various embodiments are not limited only to the reproduction system, but can be of course applied to the reproduction system of the video signal recording and reproducing apparatus.

Further, in the above-mentioned embodiments, only the case where the variable reproduction speed is higher than the recording speed (±the same speed), the present invention can be of course applied to the case where the variable reproduction speed is lower than the recording speed, that is, (1−m/M) times lower than the recording speed in quite the same way.

As described above, in the video signal reproducing method and apparatus according to the present invention, since the magnetic tape travel speed during the variable speed reproduction is set to (2n+1±m/M) times higher than the recording speed (where n: an integer of 0 or more; and m and M are a natural number, respectively; and 0<m/M≦⅓), the simultaneous reproduction timings can be partially overlapped with each other for each scanning, so that it is possible to realize variable speed reproduction having no noise bars. In particular, in the case of m/M=⅓, since one picture can be formed by 6 scannings, there exists such an effect that a smooth reproduction picture can be obtained. In addition, since it is unnecessary to discriminate the segments, it is unnecessary to insert a signal for discriminating segments into one track several times, so that there exists such an effect that the unitization efficiency of the recording medium can be improved.

Further, in the magnetic tape travel speed during the variable speed reproduction, if n is an integer of 0 or more; M is an integer of 2 or more; m and k are an integer of 1 or more, respectively; M>m (a prime number, respectively); and T≧6 (T: an integer) in m/M=2 k/T, in addition to the above-mentioned effect, there exists such an effect that one picture can be formed as with the case of the interlaced scanning of a TV set, even if the simultaneous reproduction timings are not overlapped with each other.

Further, according to the present invention, in particular, since the magnetic tape travel speed is set to (2n+1±m/M) times (n: an integer of 0 or more; and 0<m/M≦(1+Q)/6) higher than the recording speed, when signals are recorded on the magnetic tape having a head width equal to the reference track width and then reproduced by a magnetic, head having a head width Q (>0) times wider than the track width, there exists such an effect that the signals can be reproduced at variable speed without generating noise bars. In addition, since the segments are not required to be discriminated, it is unnecessary to enter the segment discriminating signal into one track several times, so that it is possible to improve the utilization efficiency of the magnetic medium.

Further, in the magnetic tape travel speed during the variable speed reproduction, if n is an integer of 0 or more; M is an integer of 2 or more; m and k are an integer of 1 or more, respectively; M>m (a prime number, respectively); T≧12/(1+Q) (T: an integer) in m/M=2 k/T, in addition to the above-mentioned effect, there exists such an effect that one picture can be formed as with the case of the interlaced scanning of a TV set, even if the simultaneous reproduction timings are not overlapped with each other.

Further, according to the present invention, in particular, since the magnetic tape travel speed is set to (2n+1±m/M) times (n: an integer of 0 or more; and 0<m/M≦(P+Q)/6) higher than the recording speed, when signals are recorded on the magnetic tape having a head width P (>0) times wider than the reference track width and then reproduced by a magnetic head having a head width Q (>0) times wider than the track width, there exists such an effect that the signals can be reproduced at variable speed without generating noise bars. In addition, since the segments are not required to be discriminated, it is unnecessary to enter the segment discriminating signal into one track several times, so that it is possible to improve the utilization efficiency of the magnetic medium.

Further, in the magnetic tape travel speed during the variable speed reproduction, if n is an integer of 0 or more; M is an integer of 2 or more; m and k are an integer of 1 or more, respectively; M>m (a prime number, respectively); T≧12/(P+Q) (T: an integer) in m/M=2 k/T, in addition to the above-mentioned effect, there exists such an effect that one picture can be formed as with the case of the interlaced scanning of a TV set, even if the simultaneous reproduction timings are not overlapped with each other.

What is claimed is:

1. A method of reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises the steps of:

reproducing a first reproduction signal recorded on a predetermined position of the magnetic tape by use of a first pair of magnetic heads having the first and second azimuth angles and arranged around a rotary drum at two opposing angular positions 180 degrees away each other, respectively;

reproducing a second reproduction signal recorded on a position adjacent to the predetermined position of the magnetic tape by use of a second pair of magnetic heads having the first and second azimuth angles and arranged around the rotary drum at two opposing angular positions 180 degrees away each other, respectively;

reproducing output video signals on the basis of the first and second reproduction signals; and setting the magnetic tape travel speed in variable speed reproduction to a value (2n+1±m/M) times higher than that in recording, where n is an integer of 0 or more; m and M are a natural number, respectively; and 0<m/M≦⅓.

2. The method of reproducing video signals recorded on a magnetic tape at a variable magnetic tape travel speed different from that in recording of claim 1, wherein the magnetic tape travel speed in variable speed reproduction is set to a value (2n+1±m/M) times higher than that in recording, where n is an integer of 0 or more; M is an integer of two or more, respectively; m and k are an integer of 1 or more, respectively; M>m (a prime number, respectively); and T≧6 (T: an integer) when m/M=2k/T.

3. A method of reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises the steps of:

reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively;

reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively;

reproducing output video signals on the basis of the first and second reproduction signals; and setting the magnetic tape travel speed in variable speed reproduction to a value $(2n+1\pm m/M)$ times higher than that in recording, where n is an integer of 0 or more; m and M are a natural number, respectively; and $0 < m/M \leq (1+Q)/6$.

4. The method of reproducing video signals recorded on a magnetic tape at a variable magnetic tape travel speed different from that in recording of claim 3, wherein the magnetic tape travel speed in variable speed reproduction is set to a value $(2n+1\pm m/M)$ times higher than that in recording, where n is an integer of 0 or more; M is an integer of two or more, respectively; m and k are an integer of 1 or more, respectively; M>m (a prime number, respectively); and $T \geq 12/(1+Q)$ (T: an integer) when $m/M=2k/T$.

5. A method of reproducing video signals recorded on a magnetic tape at a variable magnetic tape travel speed different from that in recording, a first video signal related to a first field being recorded on a first track having a track width P (P>0) times wider than a reference track width of the magnetic tape at a first azimuth angle, a second video signal related to the first field being recorded on a second track having a track width P times wider than the reference track width thereof at a second azimuth angle, an audio signal related to the first field being recorded on a third track thereof at a third azimuth angle, further the first video signal related to a second field being recorded on a fourth track having a track width P times wider than the reference track width of the magnetic tape at the second azimuth angle, the second video signal related to the second field being recorded on a fifth track having a track width P times wider than the reference track width thereof at the first azimuth angle, an audio signal related to the second field being recorded on a sixth track thereof at a fourth azimuth angle, respectively and repeatedly, which comprises the steps of:

reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively;

reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively;

reproducing output video signals on the basis of the first and second reproduction signals; and setting the magnetic tape travel speed in variable speed reproduction to a value $(2n+1\pm m/M)$ times higher than that in recording, where n is an integer of 0 or more; m and M are a natural number, respectively; and $0 < m/M \leq (P+Q)/6$.

6. The method of reproducing video signals recorded on a magnetic tape at a variable magnetic tape travel speed different from that in recording of claim 5, wherein the magnetic tape travel speed in variable speed reproduction is set to a value $(2n+1\pm m/M)$ times higher than that in recording, where n is an integer of 0 or more; M is an integer of two or more, respectively; m and k are an integer of 1 or more, respectively; M>m (a prime number, respectively); and $T \geq 12/(P+Q)$ (T: an integer) when $m/M=2k/T$.

7. An apparatus for reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises:

first reproducing means for reproducing a first reproduction signal recorded on a predetermined position of the magnetic tape by use of a first pair of magnetic heads having the first and second azimuth angles and arranged around a rotary drum at two opposing angular positions 180 degrees away each other, respectively;

second reproducing means for reproducing a second reproduction signal recorded on a position adjacent to the predetermined position of the magnetic tape by use of a second pair of magnetic heads having the first and second azimuth angles and arranged around the rotary drum at two opposing angular positions 180 degrees away each other, respectively;

control signal generating means for generating a control signal for specifying a period during which the first and second reproduction signals are reproduced at a level higher than a predetermined threshold level, respectively;

memory means controlled in write operation on the basis of a predetermined phase signal indicative of a phase difference between the control signal and the rotary drum, for storing signals obtained by processing the first and second reproduction signals;

output video signal generating means for generating output video signals on the basis of signals outputted from said memory means; and travel control means for controlling the magnetic tape travel speed in variable speed reproduction at a value $(2n+1\pm m/M)$ times higher than that in recording, where n is an integer of 0 or more; m and M are a natural number, respectively; and $0<m/M\leq\frac{1}{3}$.

8. The apparatus for reproducing video signals of claim 7, wherein said control signal generating means comprises:

detecting means for detecting levels of the first and second reproduction signals, respectively;

comparing means for comparing the detected levels with a predetermined threshold value, to output first and second comparison signals according to comparison results, respectively; and logical means for generating the control signal on the basis of a logical product of the first and second comparison signals.

9. The apparatus for reproducing video signals of claim 7, wherein said travel control means comprises:

generating means responsive to a predetermined synchronous signal synchronized with a revolution period of the rotary drum, for generating a motor drive signal;

detecting means for detecting a revolution speed of a capstan motor driven by the motor drive signal and outputting a detection signal; and dividing means for dividing the detection signal at a division ratio corresponding to the magnetic tape travel speed $(2n+1\pm m/M)$ times higher than that in recording, wherein said generating means compares the divided detection signal with the synchronous signal with respect to phase, to generate the motor drive signal.

10. The apparatus for reproducing video signals of claim 7, wherein said travel control means controls the magnetic tape travel speed in variable speed reproduction at a value $(2n+1\pm m/M)$ times higher than that in recording, where n is an integer of 0 or more; M is an integer of two or more, respectively; m and k are an integer of 1 or more, respectively; M>m (a prime number, respectively); and $T\geq 6$ (T: an integer) when $m/M=2k/T$.

11. An apparatus for reproducing video signals recorded on a magnetic tape at a variable magnetic tape travel speed different from that in recording, a first video signal related to a first field being recorded on a first track of the magnetic tape at a first azimuth angle, a second video signal related to the first field being recorded on a second track thereof at a second azimuth angle, an audio signal related to the first field being recorded on a third track thereof at a third azimuth angle, further the first video signal related to a second field being recorded on a fourth track of the magnetic tape at the second azimuth angle, the second video signal related to the second field being recorded on a fifth track thereof at the first azimuth angle, an audio signal related to the second field being recorded on a sixth track thereof at a fourth azimuth angle, respectively and repeatedly, which comprises:

first reproducing means for reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively;

second reproducing means for reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively;

control signal generating means for generating a control signal for specifying a period during which the first and second reproduction signals are reproduced at a level higher than a predetermined threshold level, respectively;

memory means controlled in write operation on the basis of a predetermined phase signal indicative of a phase difference between the control signal and the rotary drum, for storing signals obtained by processing the first and second reproduction signals;

output video signal generating means for generating output video signals on the basis of signals outputted from said memory means; and travel control means for controlling the magnetic tape travel speed in variable speed reproduction at a value $(2n+1\pm m/M)$ times higher than that in recording, where n is an integer of 0 or more; m and M are a natural number, respectively; and $0<m/M\leq(1+Q)/6$.

12. The apparatus for reproducing video signals of claim 11, wherein said control signal generating means comprises:

detecting means for detecting levels of the first and second reproduction signals, respectively;

comparing means for comparing the detected levels with a predetermined threshold value, to output first and second comparison signals according to comparison results, respectively; and logical means for generating the control signal on the basis of a logical product of the first and second comparison signals.

13. The apparatus for reproducing video signals of claim 11, wherein said travel control means comprises:

generating means responsive to a predetermined synchronous signal synchronized with a revolution period of the rotary drum, for generating a motor drive signal;

detecting means for detecting a revolution speed of a capstan motor driven by the motor drive signal and outputting a detection signal; and dividing means for dividing the detection signal at a division ratio corresponding to the magnetic tape travel speed $(2n+1\pm m/M)$ times higher than that in recording, said generating means comparing the divided detection signal with the synchronous signal with respect to phase, to generate the motor drive signal.

14. The apparatus for reproducing video signals of claim 11, wherein said travel control means controls the magnetic tape travel speed in variable speed reproduction at a value $(2n+1\pm m/M)$ times higher than that in recording, where n is an integer of 0 or more; M is an integer of two or more, respectively; m and k are an integer of 1 or more, respectively; M>m (a prime number, respectively); and $T>12/(1+Q)$ (T: an integer ) when $m/M=2k/T$.

15. An apparatus for reproducing video signals recorded on a magnetic tape at a variable magnetic tape travel speed different from that in recording, a first video signal related to a first field being recorded on a first track having a track width P (P>0) times wider than a reference track width of the magnetic tape at a first azimuth angle, a second video signal related to the first field being recorded on a second track having a track width P times wider than the reference track width thereof at a second azimuth angle, an audio signal related to the first field being recorded on a third track thereof at a third azimuth angle, further the first video signal related to a second field being recorded on a fourth track having a track width P times wider than the reference track width of the magnetic tape at the second azimuth angle, the second video signal related to the second field being recorded on a fifth track having a track width P times wider than the reference track width thereof at the first azimuth angle, an audio signal related to the second field being recorded on a sixth track thereof at a fourth azimuth angle, respectively and repeatedly, which comprises:

first reproducing means for reproducing a first reproduction signal recorded on a predetermined position of the magnetic tape by use of a first pair of magnetic heads having the first and second azimuth angles and a head width Q (Q>0) times wider than that of the first and fourth tracks and arranged around a rotary drum at two opposing angular positions 180 degrees away each other, respectively;

second reproducing means for reproducing a second reproduction signal recorded on a position adjacent to the predetermined position of the magnetic tape by use of a second pair of magnetic heads having the first and second azimuth angles and a head width Q times wider than that of the second and fifth tracks and arranged around the rotary drum at two opposing angular positions 180 degrees away each other, respectively;

control signal generating means for generating a control signal for specifying a period during which the first and second reproduction signals are reproduced at a level higher than a predetermined threshold level, respectively;

memory means controlled in write operation on the basis of a predetermined phase signal indicative of a phase difference between the control signal and the rotary drum, for storing signals obtained by processing the first and second reproduction signals;

output video signal generating means for generating output video signals on the basis of signals outputted from said memory means; and travel control means for controlling the magnetic tape travel speed in variable speed reproduction at a value $(2n+1\pm m/M)$ times higher than that in recording, where n is an integer of 0 or more; m and M are a natural number, respectively; and $0<m/M\leq(P+Q)/6$.

16. The apparatus for reproducing video signals of claim 15, wherein said control signal generating means comprises:

detecting means for detecting levels of the first and second reproduction signals, respectively;

comparing means for comparing the detected levels with a predetermined threshold value, to output first and second comparison signals according to comparison results, respectively; and logical means for generating the control signal on the basis of a logical product of the first and second comparison signals.

17. The apparatus for reproducing video signals of claim 15, wherein said travel control means comprises:

generating means responsive to a predetermined synchronous signal synchronized with a revolution period of the rotary drum, for generating a motor drive signal;

detecting means for detecting a revolution speed of a capstan motor driven by the motor drive signal and outputting a detection signal; and dividing means for dividing the detection signal at a division ratio corresponding to the magnetic tape travel speed $(2n+1\pm m/M)$ times higher than that in recording, said generating means comparing the divided detection signal with the synchronous signal with respect to phase, to generate the motor drive signal.

18. The apparatus for reproducing video signals of claim 15, wherein said travel control means controls the magnetic tape travel speed in variable speed reproduction at a value $(2n+1\pm m/M)$ times higher than that in recording, where n is an integer of 0 or more; M is an integer of two or more, respectively; m and k are an integer of 1 or more, respectively; M>m (a prime number, respectively); and $T\geq 12/(P+Q)$ (T: an integer) when $m/M=2k/T$.

* * * * *